(12) United States Patent
Wu et al.

(10) Patent No.: US 9,736,450 B2
(45) Date of Patent: *Aug. 15, 2017

(54) IMAGE DISPLAY DEVICE, IMAGE DISPLAY METHOD, AND PROGRAM

(71) Applicant: NLT Technologies, Ltd., Kanagawa (JP)

(72) Inventors: Di Wu, Kanagawa (JP); Michiaki Sakamoto, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/951,772

(22) Filed: Nov. 25, 2015

(65) Prior Publication Data

US 2016/0080718 A1    Mar. 17, 2016

Related U.S. Application Data

(63) Continuation of application No. 13/358,997, filed on Jan. 26, 2012, now Pat. No. 9,307,220.

(30) Foreign Application Priority Data

Jan. 26, 2011    (JP) .................................. 2011-013716

(51) Int. Cl.
*G06T 15/00*    (2011.01)
*H04N 13/00*    (2006.01)
(Continued)

(52) U.S. Cl.
CPC ........... *H04N 13/0022* (2013.01); *G06T 7/11* (2017.01); *G06T 7/50* (2017.01); *H04N 13/0445* (2013.01);
(Continued)

(58) Field of Classification Search
CPC .... G03H 1/08; G03H 2001/0816; G06K 9/80; G06K 9/4633; G06T 2200/04;
(Continued)

(56) References Cited

U.S. PATENT DOCUMENTS 9,307,220 B2 *  4/2016   Wu ..................... H04N 13/0022
2004/0066555 A1  4/2004   Nomura
(Continued)

FOREIGN PATENT DOCUMENTS

EP    2 268 045      12/2010
JP    6-113334       4/1994
(Continued)

OTHER PUBLICATIONS

European Search Report—EP 12 15 2433—May 10, 2012.
(Continued)

*Primary Examiner* — Gregory J Tryder
*Assistant Examiner* — Kwang Lee
(74) *Attorney, Agent, or Firm* — Young & Thompson

(57) ABSTRACT

An image display device includes region of interest extraction unit, parallax image generation unit and 3D image display unit. Region of interest extraction unit generates depth image signal by depth image conversion employing depth threshold, depth image signal including information on distance in three-dimensional space between viewpoint and each pixel of two-dimensional image including region of interest desired to be noted by observer, depth image conversion being such that depth value indicating distance between viewpoint and each pixel of two-dimensional image is converted to depth value for 2D display when depth value is equal to or larger than depth threshold. Parallax image generation unit generates both-eye parallax image having parallax in region of interest alone, from two-dimensional image and image obtained by conversion of region of (Continued)

interest image representing region of interest at each of both-eye viewpoints, based on two-dimensional image and depth image signal.

6 Claims, 50 Drawing Sheets

(51) Int. Cl.
*G06T 7/11* (2017.01)
*G06T 7/50* (2017.01)
*H04N 13/04* (2006.01)

(52) U.S. Cl.
CPC ..... *H04N 13/0456* (2013.01); *G06T 2200/04* (2013.01); *G06T 2207/10028* (2013.01)

(58) Field of Classification Search
CPC ........ G06T 2207/10028; G01B 11/002; A61B 1/00009; H04N 13/0022; H04N 13/0445
USPC ....................................................... 345/422
See application file for complete search history.

(56) References Cited

U.S. PATENT DOCUMENTS

| | | |
|---|---|---|
| 2006/0087556 A1 | 4/2006 | Era |
| 2008/0002910 A1 | 1/2008 | Ojima et al. |
| 2009/0128622 A1 | 5/2009 | Uchiumi et al. |
| 2011/0001802 A1* | 1/2011 | Misawa ................ G06T 7/0075 348/51 |
| 2011/0037784 A1 | 2/2011 | Shiomi |
| 2011/0096832 A1 | 4/2011 | Zhang et al. |
| 2011/0249886 A1 | 10/2011 | Park et al. |
| 2011/0310098 A1* | 12/2011 | Kimoto .............. H04N 13/0022 345/419 |
| 2013/0162641 A1* | 6/2013 | Zhang ................ H04N 13/0018 345/419 |

FOREIGN PATENT DOCUMENTS

| | | |
|---|---|---|
| JP | 7-281644 | 10/1995 |
| JP | 9-37303 | 2/1997 |
| JP | 11-155154 | 6/1999 |
| JP | 2001-359119 | 12/2001 |
| JP | 2007-036528 | 2/2007 |
| JP | 2009-296118 | 12/2009 |
| WO | 99/53430 | 10/1999 |
| WO | WO2009/157221 | 12/2009 |
| WO | 2010/111191 | 9/2010 |
| WO | WO 2010/116614 | 10/2010 |

OTHER PUBLICATIONS

Japanese Office Action dated Apr. 8, 2014 in corresponding Japanese Patent Application No. 2011-013716 with English translation of Japanese Office Action.

* cited by examiner

TWO-DIMENSINAL IMAGE SIGNAL 1000a OF IMMEDIATELY PRECEDING FRAME OBTAINTED BY DIVISION

COMPUTATION OF OPTICAL FLOW

LEFT-EYE TWO-DIMENSIONAL IMAGE SIGNAL 1000La OF IMMEDIATELY PRECEDING FRAME OBTAINED BY DIVISION

RIGHT-EYE TWO-DIMENSIONAL IMAGE SIGNAL 1000Ra OF IMMEDIATELY PRECEDING FRAME OBTAINED BY DIVISION

RIGHT-EYE TWO-DIMENSIONAL IMAGE SIGNAL 2000Ra OF CURRENT FRAME OBTAINED BY DIVISION

OPTICAL FLOW OF EACH REGION IN RIGHT-EYE TWO-DIMENTIONAL IMAGE SIGNAL

FIG. 40

| SHAPE \ AREA RANGE | DEPTH ESTIMATION LUT SIGNAL | | |
|---|---|---|---|
| | (1~5) | (6~10) | (10~20) |
| TRIANGLE | 20 | 50 | 70 |
| RECTANGLE | 10 | 20 | 30 |
| CIRCLE | 5 | 10 | 20 |
| ... | ... | ... | ... |

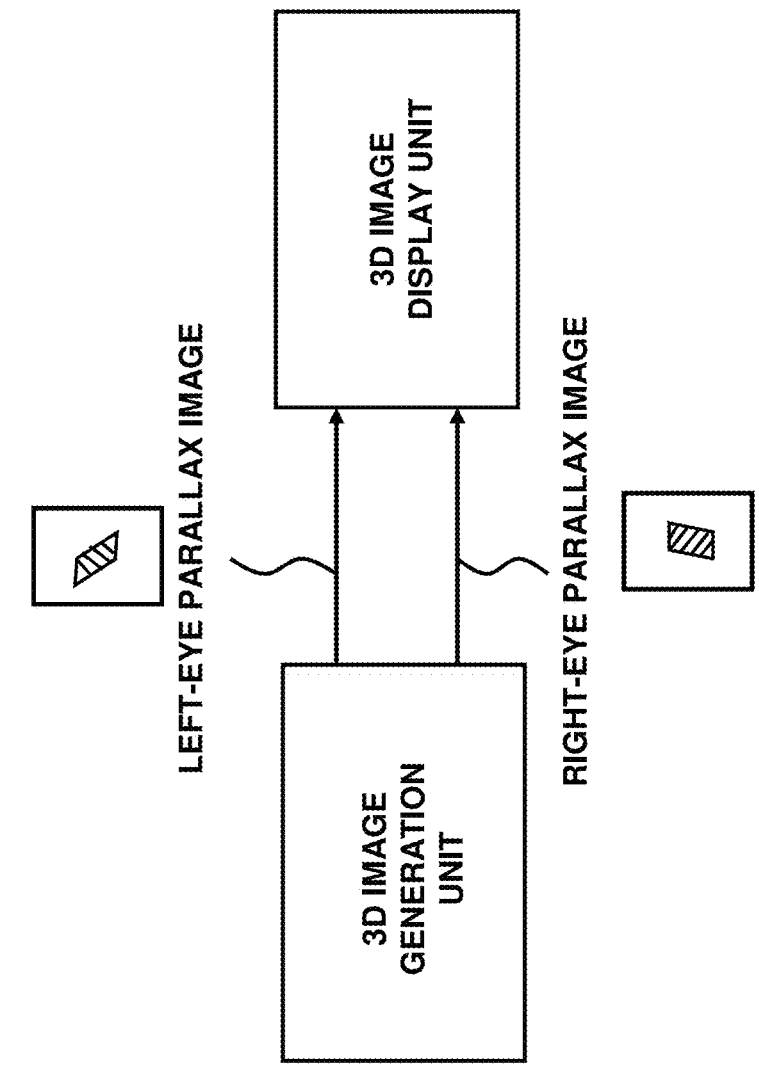

IMAGE DISPLAY DEVICE, IMAGE DISPLAY METHOD, AND PROGRAM

REFERENCE TO RELATED APPLICATION

This application is based upon and claims the benefit of the priority of Japanese patent application No. 2011-013716 filed on Jan. 26, 2011, the disclosure of which is incorporated herein in its entirety by reference thereto.

TECHNICAL FIELD

The present invention relates to an image display device, an image display method, and a computer program. More specifically, the invention relates to an image display device in which a mixture of 2D (two-dimensional image) and 3D (three-dimensional image) images is displayed on one screen.

BACKGROUND 3D images can perform more sophisticated representation than 2D images, and therefore, combined with advances in image display technology in recent years, have drawn increasing attention. A 3D image is implemented by using recognition of a space to be three-dimensional due to a parallax between left and right eyes. More specifically, the 3D image is implemented by an image display device as shown in FIG. 50. A 3D image display unit receives an input image for a left eye (left-eye parallax image) and an input image for a right eye (right-eye parallax image) to adjust these images to be recognized separately between the right and left eyes of the observer, thereby implementing 3D representation (three-dimensional representation). The left-eye parallax image and the right-eye parallax image are represented by signals generated in view of a parallax between the right and left eyes.

Patent Document 1 discloses a technology of detecting a region of a stereoscopic video an observer is estimated to gaze at when observing the stereoscopic video, applying a lowpass filtering process to a signal representing a region having a parallax amount different from that of this detected region, thereby causing the observer to perceive the region other than the region estimated to be gazed at by the observer in a blurred state.

Patent Document 2 discloses a technology of generating a pseudo three-dimensional video signal. When an optical flow in a two-dimensional video signal is larger than a predetermined value, a time difference corresponding to the optical flow is added. A parallax is thereby generated. The two-dimensional video signal is converted to a left-eye video signal and a right-eye video signal in a pseudo manner. The pseudo three-dimensional video signal is generated based on the left-eye video signal and the right-eye video signal.

Patent Document 3 discloses a technology of adding identification information indicating a stereoscopic image to stereoscopic image data. In this technology, when an observer observes the stereoscopic image by a device that can perform stereoscopic display, the observer is made to perceive that the image he is observing is the stereoscopic image. On the other hand, when the observer observes the stereoscopic image by a device that can perform stereoscopic display, the identification information added to the stereoscopic image is disposed at a position that does not impede the stereoscopic display of the stereoscopic image.

Patent Document 4 discloses a technology of displaying a mixture of 2D and 3D images and performing stereoscopic display, thereby reducing an amount of data and power consumption. An image display device described in Patent Document 4 is constituted from a parallax image generation unit and a 3D image display unit. The parallax image generation unit receives a two-dimensional image, a region of interest image, and region of interest shape information or a depth image signal. The parallax image generation unit converts a region corresponding to the region of interest of the two-dimensional image to images taken from two different viewpoints. The parallax image generation unit generates a left-eye parallax image and a right-eye parallax image, for output. The 3D image display unit rearranges the generated left-eye parallax image and the generated right-eye parallax image to perform display of a mixture of the 2D and 3D images.

The received two-dimensional image is represented by a signal indicating an image viewed from one of the right and left viewpoints, for 3D display. The region of interest image is an image representing a region of interest in the two-dimensional image. The region of interest means a region of the entire two-dimensional image to be stereoscopically shown. The region of interest shape information includes information such as the position and the shape of the region of interest in the two-dimensional image. The depth image signal is a signal indicating a distance between the viewpoint and an object within the two-dimensional image, in a three-dimensional space.

The parallax image generation unit performs geometric transforms such as affine transform and transmitting transform and filtering in a frequency domain on a signal indicating the region of interest to give a parallax to each pixel in the region of interest image. An image having a mixture of the 2D and 3D images is thereby generated. That is, the generated image of a region other than the region of interest that is represented by the left-eye parallax image and the right-eye parallax image is the same as the two-dimensional image of the region other than the region of interest. The left-eye parallax image and the right-eye parallax image are images having a parallax with respect to the region of interest alone, and are the same with respect to the region other than the region of interest.

[Patent Document 1] JP Patent Kokai Publication No. JP-A-11-155154
[Patent Document 2] JP Patent Kokai Publication No. JP-A-7-281644
[Patent Document 3] JP Patent Kokai Publication No. JP-P-2007-036528A
[Patent Document 4] International Publication No. WO2010/116614

SUMMARY

The entire disclosures of Patent Documents 1 to 4 are incorporated herein by reference thereto. The following analyses are given in view of the present invention.

As described above, 3D images have a higher power of expression than 2D images, and are expected to be used in various fields not limited to the field of entertainment alone. In order to implement a 3D image, however, a more amount of information than in the case of a 2D image is needed as a trade-off for the higher power of expression. In the image display device shown in FIG. 50, the left-eye parallax image corresponding to the viewpoint of a left eye and the right-eye parallax image corresponding to the viewpoint of a right eye become necessary. In the technology disclosed in Patent Document 1, a left-eye parallax image and parallax information for generating a right-eye parallax image from the left-eye parallax image become necessary.

As described above, an amount of data needed for representing the 3D image is larger than an amount of data for representing the 2D image. When the amount of data is increased, data transfer may not be able to be performed through a cable connecting a device for outputting a video and a device for displaying the video, and may exceed an amount of the data transfer that can be handed by an internal data bus within the same device. Further, an image display device for displaying images viewed from a plurality of viewpoints using a same optical amount as an image viewed from a single viewpoint consumes much power. In the technology disclosed in Patent Document 1, the filtering process is performed on an input video signal representing a 3D video of an entire screen. Each of the input video signal and an output video signal represents a stereoscopic video. Accordingly, a data transfer amount and power consumption increase more remarkably than in the case of a two-dimensional video.

In the technology disclosed in Patent Document 2, a parallax amount is computed based on the amount of movement in the two-dimensional video signal, thereby generating the left-eye video signal and the right-eye video signal. An overall output video is represented by a three-dimensional signal, so that power consumption increases more than in the case of two-dimensional display.

Further, in the technology disclosed in Patent Document 3, the stereoscopic image data is identified by an identification mark indicating the stereoscopic image. A method of automatically extracting a region of interest, a method of automatically determining the region of interest, and a method of making the region of interest to be viewed stereoscopically are not referred to. In the technology disclosed in Patent Document 4, there is the need for preparing for the attention image region to be noted by an observer, in advance. For that reason, there is the need for generating the attention image region in addition to the two-dimensional image.

As described above, the 3D image has an extremely high power of expression, and is expected to become more widespread. However, much more amount of data than for the 2D image is needed for the 3D image. Then, there may arise problems such as a shortage of a data transfer capacity and an increase in power consumption. Further, even in the technology disclosed in Patent Document 4, the image of the region of interest to be noted by the observer is necessary, and there is the need for generating the image of the region of interest, in addition to a video to be displayed stereoscopically.

According to an aspect of the present invention, there is desired an image display device, an image display method, and a program for implementing a 3D image by automatically generating a region of interest image to be noted by an observer while reducing a data amount and power consumption.

According to a first aspect of the present invention, there is provided an image display device, comprising: a region of interest extraction unit, a parallax image generation unit, and a 3D image display unit.

The region of interest extraction unit generates a depth image signal by depth image conversion employing a depth threshold, the depth image signal including information on a distance in a three-dimensional space between a viewpoint and each pixel of a two-dimensional image including a region of interest desired to be noted by an observer, the depth image conversion being such that a depth value indicating the distance between the viewpoint and each pixel of the two-dimensional image is converted to a depth value for 2D display when the depth value is equal to or larger than the depth threshold.

The parallax image generation unit generates a left-eye parallax image and a right-eye parallax image each having a parallax in the region of interest and having no parallax in a region other than the region of interest, from the two-dimensional image and an image obtained by conversion of a region of interest image to be displayed in the region of interest at each of right and left viewpoints, based on the two-dimensional image and the depth image signal.

The 3D image display unit displays the left-eye parallax image and the right-eye parallax image.

According to a second aspect of the present invention, there is provided an image display method, comprising: extracting a region of interest, generating a parallax image, and displaying a 3D image.

The extracting the region of interest is performed from a two-dimensional image a region of interest desired to be noted by an observer, by generating a depth image signal through depth image conversion employing a depth threshold, the depth image signal including information on a distance in a three-dimensional space between a viewpoint and each pixel of the two-dimensional image including the region of interest, the depth image conversion being such that a depth value indicating the distance between the viewpoint and each pixel of the two-dimensional image is converted to a depth value for 2D display when the depth value is equal to or larger than the depth threshold.

The generating the parallax image is performed by generating a left-eye parallax image and a right-eye parallax image each having a parallax in the region of interest and having no parallax in a region other than the region of interest, from the two-dimensional image and an image obtained by conversion of a region of interest image to be displayed in the region of interest at each of right and left viewpoints, based on the two-dimensional image and the depth image signal.

The displaying the 3D image is performed by displaying the left-eye parallax image and the right-eye parallax image. This method is associated with particular machines, an image display device.

According to a third aspect of present invention, there is provided a program for causing a computer comprising an image display device to execute a region of interest extraction process, a parallax image generation process, and a 3D image display process.

The region of interest extraction process is performed from a two-dimensional image a region of interest desired to be noted by an observer, by generating a depth image signal through depth image conversion employing a depth threshold, the depth image signal including information on a distance in a three-dimensional space between a viewpoint and each pixel of the two-dimensional image including the region of interest, the depth image conversion being such that a depth value indicating the distance between the viewpoint and each pixel of the two-dimensional image is converted to a depth value for 2D display when the depth value is equal to or larger than the depth threshold.

The parallax image generation process is performed by generating a left-eye parallax image and a right-eye parallax image each having a parallax in the region of interest and having no parallax in a region other than the region of interest, from the two-dimensional image and an image obtained by conversion of a region of interest image to be displayed in the region of interest at each of right and left viewpoints, based on the two-dimensional image and the depth image signal.

The 3D image display process is performed by displaying the left-eye parallax image and the right-eye parallax image. The program can be recorded on (or embedded in) a computer readable storage (or recording) medium. That is, the present invention may be embodied as a computer program product.

The meritorious effects of the present invention include as the following, without limitation hereto.

According to the respective aspects of the present invention, there are provided an image display device, an image display method, and a program for implementing a 3D image by automatically generating a region of interest image to be noted by an observer while reducing a data amount and power consumption by stereoscopically representing only a region of interest and mixing the region of interest with a two-dimensional image. Assume that, when the region of interest is automatically extracted, an input signal indicates a video. Then, by performing depth conversion in view of an optical flow, a depth image signal including information corresponding to the region of interest image is generated. A mixture of 2D and 3D contents that is more interesting, has a rich power of expression, and does not impose much burden on eyes can be thereby created. Even when the input signal indicates a still two-dimensional image, it also becomes possible to convert the depth value of a region other than the region of interest to a depth value for 2D display, and automatically convert only the region of interest into a 3D image.

BRIEF DESCRIPTION OF THE DRAWINGS

FIG. 40 is a table showing an example of a depth estimation LUT signal;

FIG. 50 shows a configuration example of an image display device that implements 3D representation.

PREFERRED MODES

Note that the reference to the drawings by way of marks, symbols, or figure recited in the present disclosure is intended merely to help understanding and not for limitation purpose.

[First Exemplary Embodiment]

For an image display device for display of a mixture of 2D and 3D images according to a first exemplary embodiment of the present invention, a region of interest extraction unit for automatically converting a region of interest into a 3D image is also provided, in addition to a parallax image generation unit for generating a left-eye parallax image and a right-eye parallax image and a 3D image display unit for performing the display of the mixture of 2D and 3D images.

Figure 1:
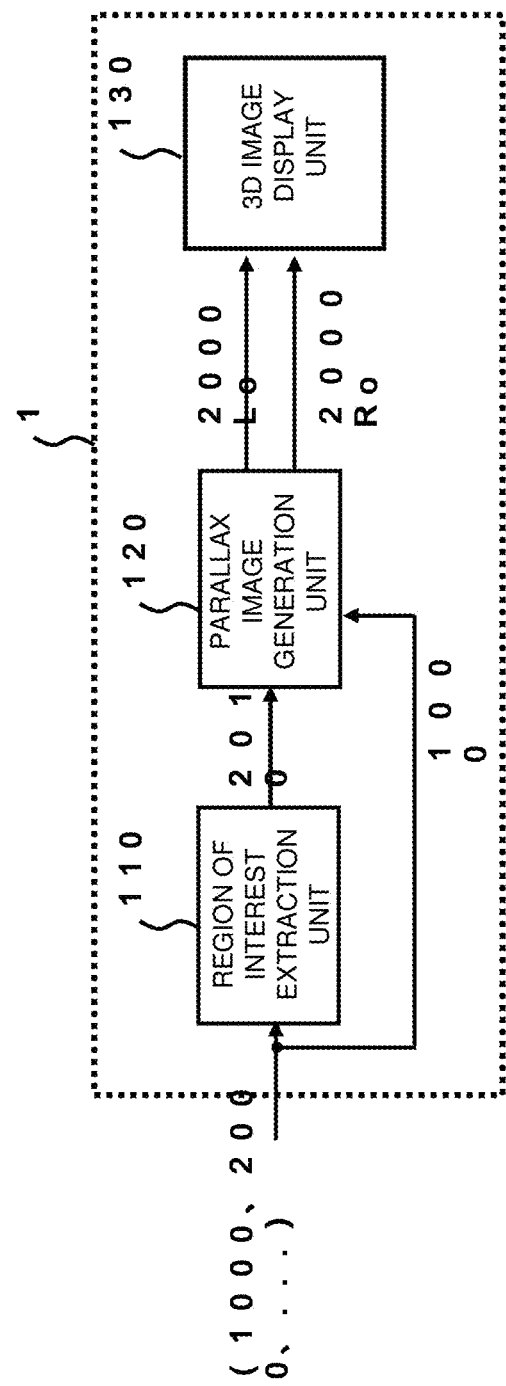
FIG. 1 is a block diagram showing a configuration of an image display device according to a first exemplary embodiment of the present invention.

A configuration of an image display device according to the first exemplary embodiment of the present invention will be described with reference to FIG. 1. FIG. 1 is a block diagram showing a configuration of an image display device 1 according to this exemplary embodiment. As shown in FIG. 1, the image display device 1 includes a region of interest extraction unit 110, a parallax image generation unit 120, and a 3D image display unit 130. The region of interest extraction unit 110 receives a photographed two-dimensional video for each frame. Two-dimensional images of respective frames are respectively indicated by 1000, 2000, and the like. The region of interest extraction unit 110 estimates a depth image 2000d corresponding to the frame image 2000 being currently processed (hereinafter abbreviated as a current frame) based on luminance information and optical flow information included in two-dimensional image signals that have been successively received. A depth image signal is a signal that directly represents a distance (depth value) between a viewpoint and an object in an image, in a three-dimensional space. In the following description, it is assumed that the distance between the viewpoint and the object can be represented in a range of 8 bits, for each pixel. Next, the region of interest is determined based on a depth threshold with an optical flow used as a parameter. A depth value of a region other than the region of interest is converted to a depth for 2D display. Then, a depth image 2010 obtained by the conversion is output from the region of interest extraction unit 110.

The parallax image generation unit 120 computes parallax information on each pixel of the region of interest image from the depth image 2010 obtained by the conversion, thereby generating a left-eye parallax image 2000Lo and a right-eye parallax image 2000Ro. Finally, the 3D image display unit 130 rearranges the generated left-eye parallax image 2000Lo and the generated right-eye parallax image 2000Ro to perform display of a mixture of 2D and 3D images.

A configuration of each process block will be described in the order from an input to an output.

Figure 2:
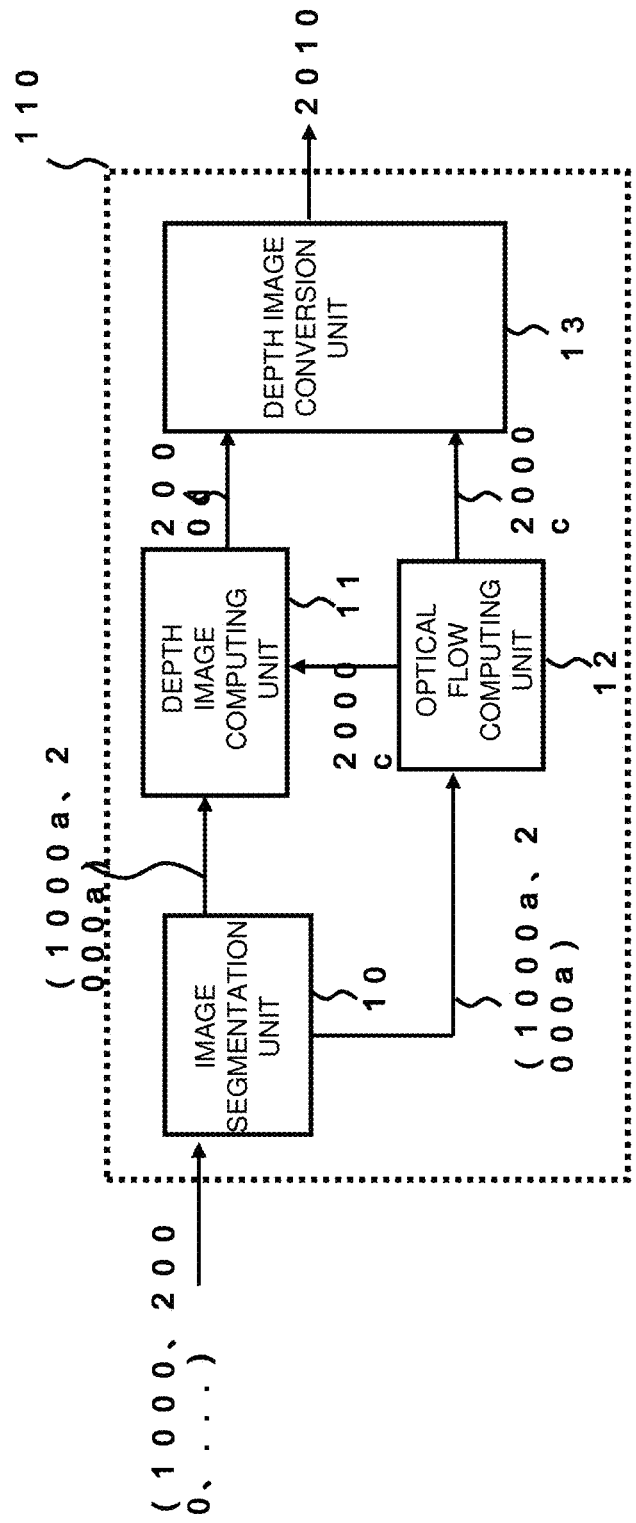
FIG. 2 is a block diagram showing a configuration example of a region of interest extraction unit in the image display device in the first exemplary embodiment of the present invention.

FIG. 2 is a block diagram showing a configuration of the region of interest extraction unit 110. The region of interest extraction unit 110 is constituted from an image segmentation unit 10, a depth image computing unit 11, an optical flow computing unit 12, and a depth image conversion unit 13.

In order to increase a speed and accuracy of each of processes such as optical flow computation and depth image estimation that will be described later, it is arranged that the process is not performed for each pixel, and that computation is performed for each of regions obtained by division of a received two-dimensional image into the regions in advance. A plurality of the two-dimensional images (1000, 2000) is successively supplied to the image segmentation unit 10. Herein, the following description will be given, with the two-dimensional image of an immediately preceding frame written as the two-dimensional image 1000 and the two-dimensional image of a current frame written as the two-dimensional image 2000. The image segmentation unit 10 performs a division process of dividing each of the received two-dimensional images (1000, 2000) into regions having similar pixel characteristics (of color information and position information) by referring to coordinate values and color information on the two-dimensional image. That is, each two-dimensional image is divided into the regions having the similar characteristics. Then, a labeling process is performed on each region obtained by the division, and it is so arranged that pixel values of an output image obtained by the division are labeling values of the respective regions obtained by the division. A signal obtained by the division of the two-dimensional image 1000 represents a divided two-dimensional image 1000a. A signal obtained by the division of the two-dimensional image 2000 represents a divided two-dimensional image 2000a. A specific example of the image segmentation process will be described later.

Next, the divided two-dimensional images (1000a, 2000a) are supplied to the optical flow computing unit 12, and a correspondence (optical flow) between respective regions of the two-dimensional image 1000 of the immediately preceding frame and the two-dimensional image 2000 of the current frame is estimated, using the color information, the luminance information, and area information. Specifically, a difference value between the centers of gravity of the regions corresponding to each other derived from the color information, the luminance information, and the like is output as an optical flow 2000c of this region.

Further, the divided two-dimensional images (1000a, 2000a) and the optical flow of each region output from the optical flow computing unit 12 are supplied to the depth image computing unit 11. The depth image computing unit 11 estimates a depth value of each region, by referring to the position information, the optical flow, the luminance information, and the like of each region.

Figure 3:
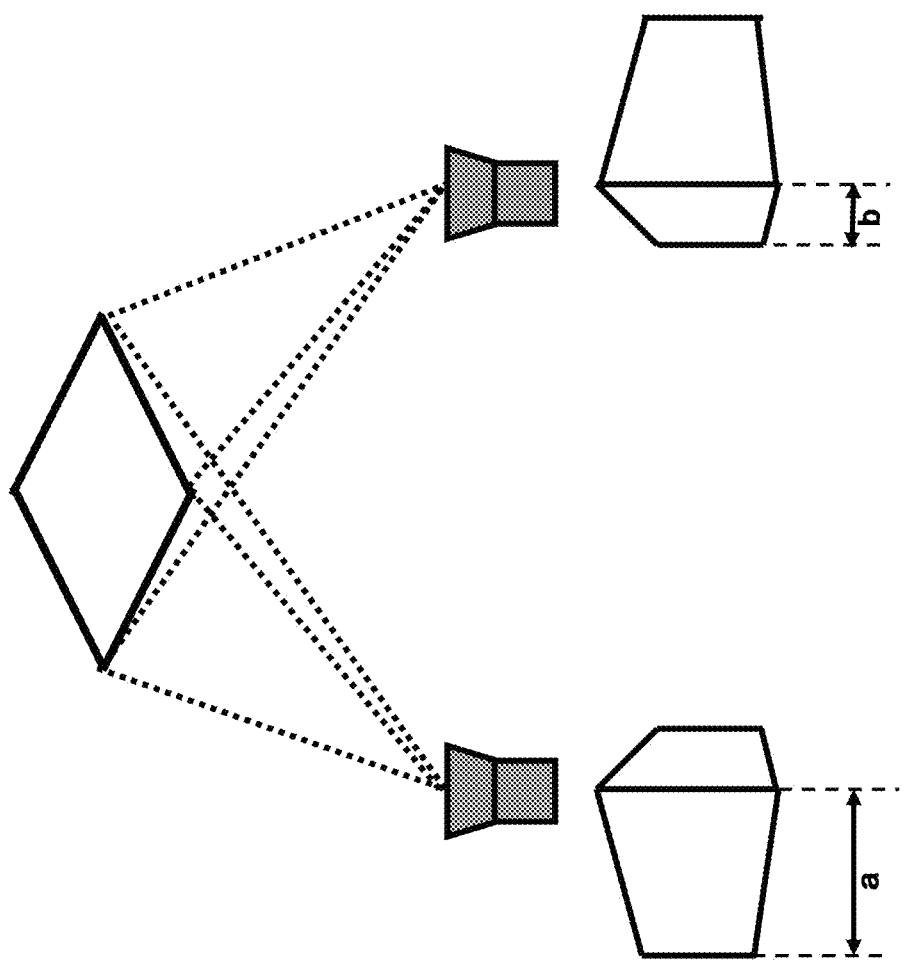
FIG. 3 is a diagram for explaining an amount of parallax between right and left viewpoints.
Figure 4:
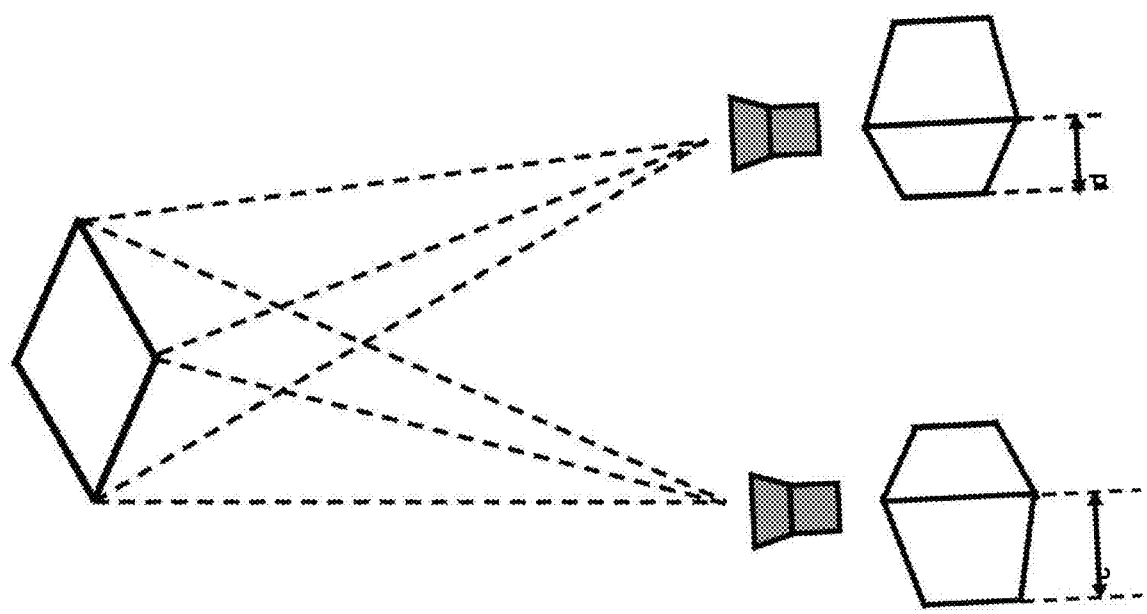
FIG. 4 is a diagram for explaining an amount of parallax between right and left viewpoints.

A relationship between a parallax amount and a depth value will be described, using FIGS. 3 and 4. FIGS. 3 and 4 are diagrams each for explaining a parallax amount when a certain object is observed from each of right and left viewpoints in a three-dimensional space. The parallax amount indicates an amount of displacement between right and left viewpoints. When a distance between the object and each viewpoint is near as shown in FIG. 3, a difference in distances for recognizing the same object greatly differs (refer to a distance a and distance b in FIG. 3). On the other hand, when a distance between the object and each viewpoint is far as shown in FIG. 4, a difference in distances for recognizing the same object is small (refer to a distance c and distance d in FIG. 4). As described above, a large parallax amount means that a distance between each viewpoint and an object region is near. Thus, a small depth value is computed. On the contrary, a small parallax amount means that a distance between each viewpoint and an object region is far. Thus, a great depth value is computed.

As described above, a depth value can be estimated from a parallax amount. An input signal, however, has only information on one camera. Accordingly, the depth value is estimated by the luminance information on the divided two-dimensional image 2000a.

The depth value estimated by the depth image computing unit 11 and the optical flow 2000c of each region output from the optical flow computing unit 12 are supplied to the depth image conversion unit 13. As described above, the smaller the distance between a viewpoint and an object region is, the larger the parallax amount is. Accordingly, when an object region near to the viewpoint is extracted as the region of interest, a more natural representation of a mixture of 2D and 3D images is obtained. Then, the depth image conversion unit 13 performs a conversion process on a depth image signal 2000d indicating the depth value, using conversion expressions shown in Equations (1) and (2).

$$D1 < Dth(v):D2=D1 \quad (1)$$

$$D1 > Dth(v):D2=255 \quad (2)$$

where D1 denotes the depth value before the conversion, D2 denotes a depth value obtained by the conversion, Dth denotes a depth threshold, and v denotes the optical flow 2000c.

Equation (2) determines the depth threshold using the optical flow of each region. When the depth value of a certain region is larger than the depth threshold, the depth value of a target object represented by this region is converted to a depth value for 2D display. The depth value for 2D display is determined according to a method of arranging right and left cameras in a 3D space. When the right and left cameras are disposed in parallel, the depth value for 2D display is infinitely distant from a viewpoint. When the right and left cameras are disposed in a shift sensor method, the depth value for 2D display indicates a distance to the screen surface of each camera. An example of the conversion of the depth value using stereo cameras arranged in parallel will be herein described. A target object having a depth value larger than the depth threshold is regarded to be indefinitely distant from a viewpoint, and the depth value is converted to 255. Equation (1) indicates that depth value conversion is not performed when the depth value of a certain region is smaller than the depth threshold. By performing the conversion process as described above, a region having a depth value obtained by the conversion being not 255 is extracted as the region of interest image. The conversion as described above creates a perception of so-called image pop-up that the image is coming out of the screen. A depth image signal obtained by the conversion is indicated by reference numeral 2010.

Figure 5:
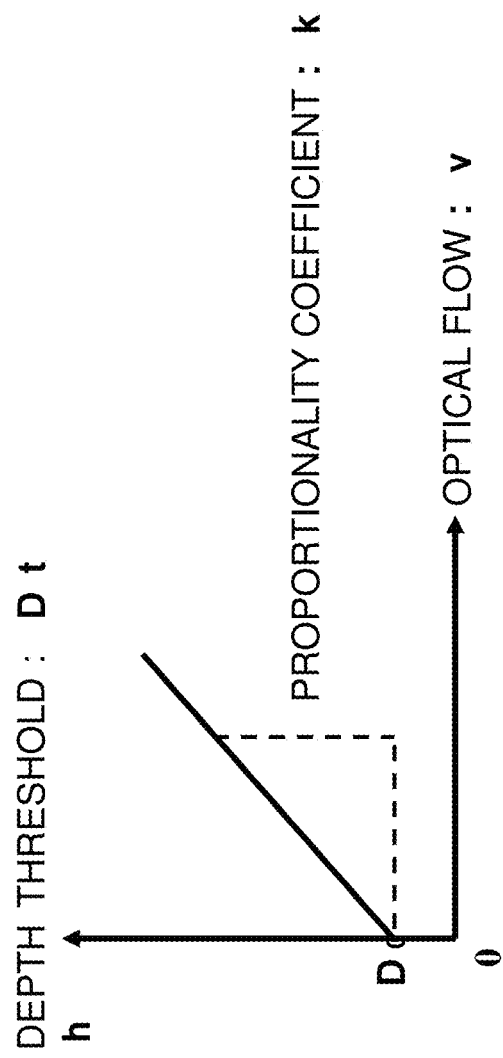
FIG. 5 is a graph showing an example of a relationship between a depth threshold and an amount of movement.

Next, a relationship between the depth threshold and the optical flow will be described. According to Equations (1) and (2), an object region near to a viewpoint is displayed stereoscopically. A region having a large optical flow may come close to an observer after several frames to become the region of interest. Thus, by setting the depth threshold to be high in advance for 3D display, a more interesting mixture of 2D and 3D images having a rich power of expression can be created. In order to achieve that purpose, the relationship between the depth threshold and the optical flow is defined as a linear relationship as indicated by Equation (3).

$$Dth(v)=k \times v+D0 \quad (3)$$

where k indicates a proportionality coefficient between the depth threshold and the optical flow, D0 indicates the depth threshold of a still object. FIG. 5 illustrates the relationship indicated by Equation (3).

When an object makes extremely rapid movement at a time of observation of the 3D screen, the observer may not be able to keep track of the movement. In order to prevent such a phenomenon, a relationship between the depth threshold and the optical flow as shown in each of Equations (4) and (5) may be used.

$$v < vth:Dth=k1 \times v+D1 \quad (4)$$

$$v > vth:Dth=k2 \times v+D2 \quad (5)$$

Figure 6:
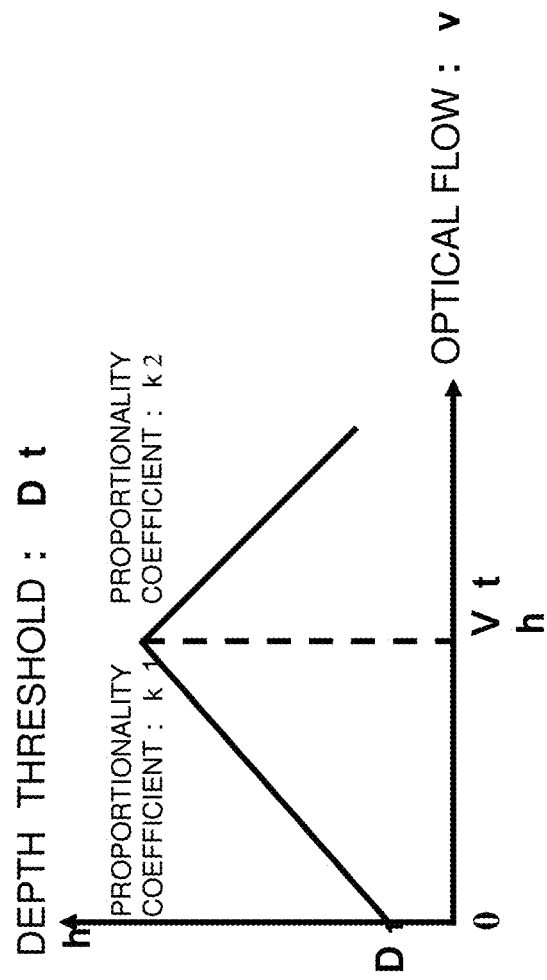
FIG. 6 is a graph showing an example of the relationship between the depth threshold and the amount of movement.

That is, when the optical flow of the object becomes equal to or larger than a certain value vth, a proportionality coefficient k2 for the depth threshold and the optical flow is set to a negative value, or the proportionality coefficient k2 is reduced to be lower than a proportionality coefficient k1 (k2<k1). Conversion from a 2D image to a 3D image is thereby made to be moderate to reduce burden on eyes. FIG. 6 illustrates the relationship indicated by Equations (4) and (5).

Figure 7:
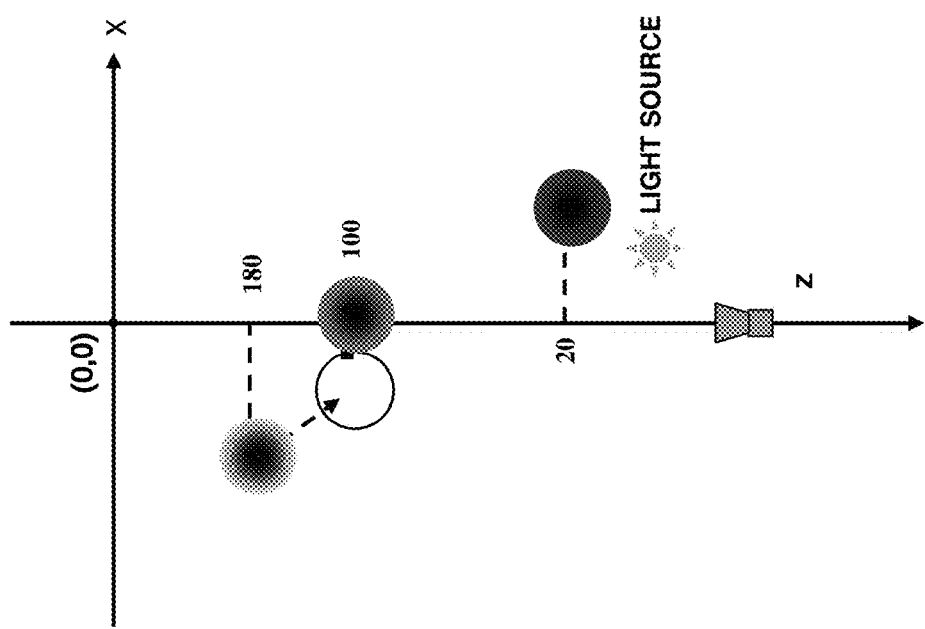
FIG. 7 is a diagram showing placement of each object in a 3D space.
Figure 8:
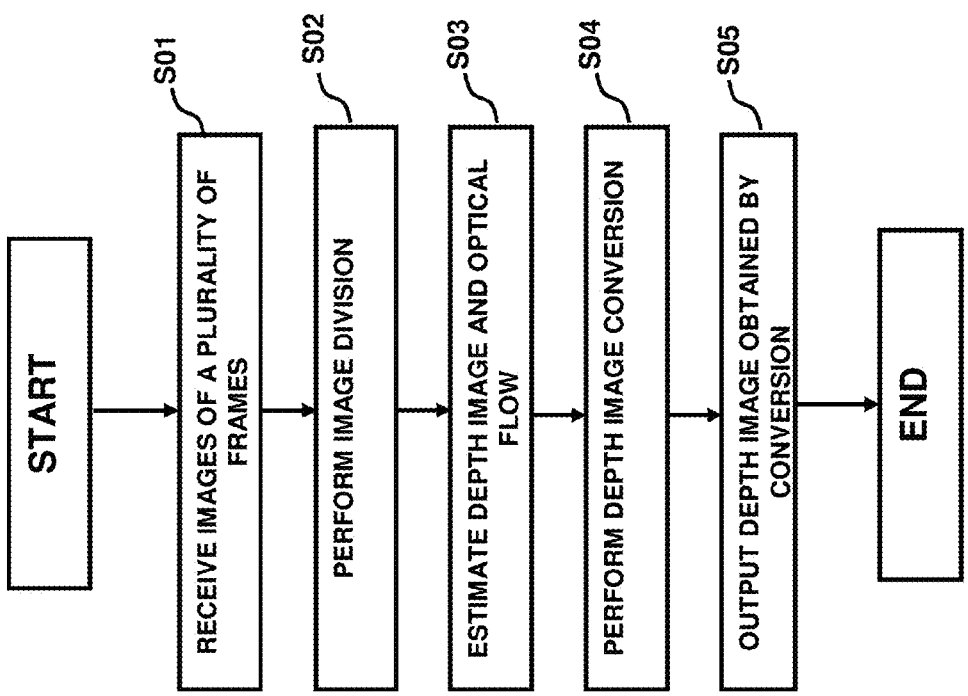
FIG. 8 is a flowchart for explaining a region of interest extraction process.

Next, a method of extracting a region of interest will be specifically explained. A description will be given about a process of extracting a region of interest from a three-dimensional space in which three balls as shown in FIG. 7 are disposed, referring to FIG. 8. FIG. 8 is a diagram showing a flowchart of the region of interest extraction process.

As shown in FIG. 7, a ball 1 is placed at a position separated from a viewpoint position in a line-of-sight direction by a depth value of 180. Then, it is assumed that the ball 1 moves from that position along a trajectory of movement indicated by a dotted arrow. Balls 2 and 3 are fixed at locations respectively separated from the viewpoint position by depth values 100 and 20. When the movements of the objects in the three-dimensional space as described above are photographed chronologically using a camera located at the viewpoint position of a z axis, two-dimensional images (1000, 2000) of a plurality of frames can be obtained.

Figure 9:
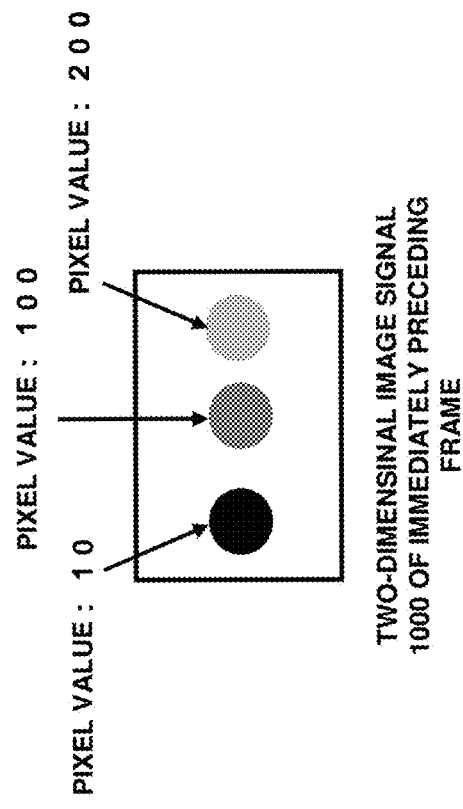
FIG. 9 is a diagram showing a two-dimensional image of an immediately preceding frame in the region of interest extraction process in FIG. 8.
Figure 10:
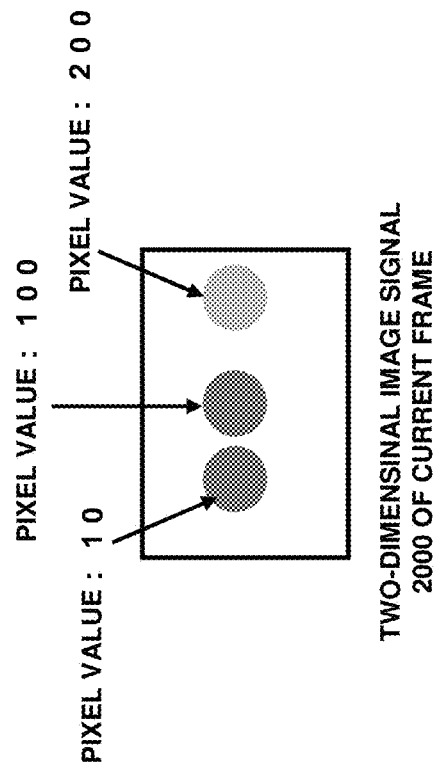
FIG. 10 is a diagram showing a two-dimensional image of a current frame in the region of interest extraction process in FIG. 8.

In step S01, the photographed two-dimensional images (1000, 2000) of the frames are chronologically supplied to the region of interest extraction unit 110. The two-dimensional image 1000 of the immediately preceding frame in that case is shown in FIG. 9, while the two-dimensional image 2000 of the current frame is shown in FIG. 10. Luminance values of pixels corresponding to the three balls are respectively 10, 100, and 200 in the two-dimensional image 1000. Luminance values of pixels corresponding to the three balls are respectively, 100, 100, and 200 in the two-dimensional space 2000.

Figure 11:
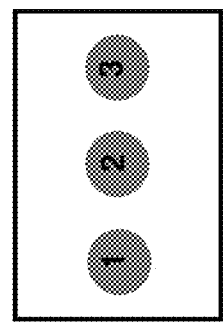
FIG. 11 is a diagram showing a divided two-dimensional image of the immediately preceding frame in the region of interest extraction process in FIG. 8.
Figure 12:
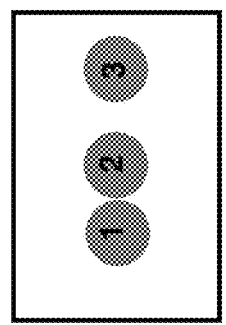
FIG. 12 is a diagram showing a divided two-dimensional image of the current frame in the region of interest extraction process in FIG. 8.

In step S02, the division process and the labeling process are performed to output the divided two-dimensional image 1000a and the divided two-dimensional image 2000a. In the division process, the received two-dimensional image 1000 of the immediately preceding frame and the two-dimensional image 2000 of the current frame are divided into regions having similar pixel characteristics (such as color information and position information), by referring to coordinate values and the color information. In the labeling process, the regions obtained by the division are labeled in order. Since pixel values of pixels indicating a same one of the balls are equal in the received two-dimensional images 1000 and 2000, an image corresponding to each of the three balls is set to one divided region. The pixel value of the image corresponding to each of the three balls in each of the divided two-dimensional image 1000a and the divided two-dimensional image 2000a is the labeled value of the corresponding region. The divided two-dimensional image 1000a of the immediately preceding frame is shown in FIG. 11, while the divided two-dimensional image 2000a of the current frame is shown in FIG. 12.

Figure 13:
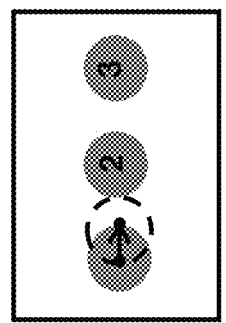
FIG. 13 is a diagram showing a result of computation of an amount of movement in the region of interest extraction process in FIG. 8.

In step S03, a correspondence between respective regions of the divided two-dimensional image 1000a of the immediately preceding frame and the divided two-dimensional image 2000a of the current frame is estimated, using the color information and the luminance information on the divided regions. As a result, the correspondence between the respective regions of the divided two-dimensional image 1000a of the immediately preceding frame and the divided two-dimensional image 2000a of the current frame is as shown in FIG. 13, and a difference value between positions of the centers of gravity of the regions corresponding to each other is output as an optical flow. The optical flow is computed, based on information on a screen coordinate system such as the width of a screen for display and the like and position information on positions of the respective regions of the images of the current frame and the immediately preceding frame. When the width of the screen is set to 100, for example, the optical flow of the ball 1 in the example of FIG. 13 corresponds to 12. Accordingly, the optical flow of the ball 1 is computed as 12, and optical flows of the balls 2 and 3 that have not moved are computed as 0. A description will be hereinafter given, assuming that the width of the screen is set to 100.

Next, an optical flow between the respective corresponding regions of the divided two-dimensional image 2000a of the current frame and the divided two-dimensional image 1000a of the immediately preceding frame is supplied to the depth image computing unit 11. The depth image computing unit 11 refers to the position information, the optical flow, and the luminance information of each region to estimate the depth image signal 2000d for each region.

Figure 14:
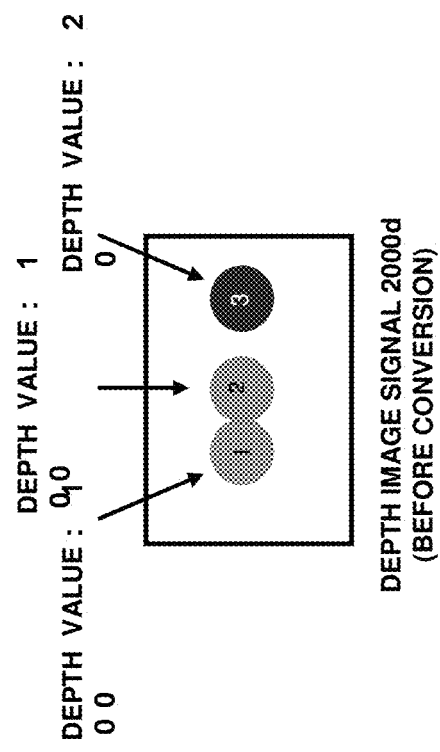
FIG. 14 is a diagram showing a depth image signal in the region of interest extraction process in FIG. 8.

Herein, a depth is estimated by luminance information on an input image. Let us assume in advance that the light source is disposed between the object and the viewpoint. Then, it is considered that a luminance difference among these three balls in the received two-dimensional image occurs due to a difference among distances of the three balls from the light source. It can be then estimated that the larger a luminance value, the smaller a depth value is. Based on the luminance information on the divided two-dimensional image 2000a of the current frame (that the ball 1 has the same luminance value as the ball 2, and the ball 3 has the largest luminance value), the depth image signal 2000d as shown in FIG. 14 can also be estimated. FIG. 14 shows that each of the balls 1 and 2 has a depth value of 100 and the ball 3 has a depth value of 20.

Figure 15:
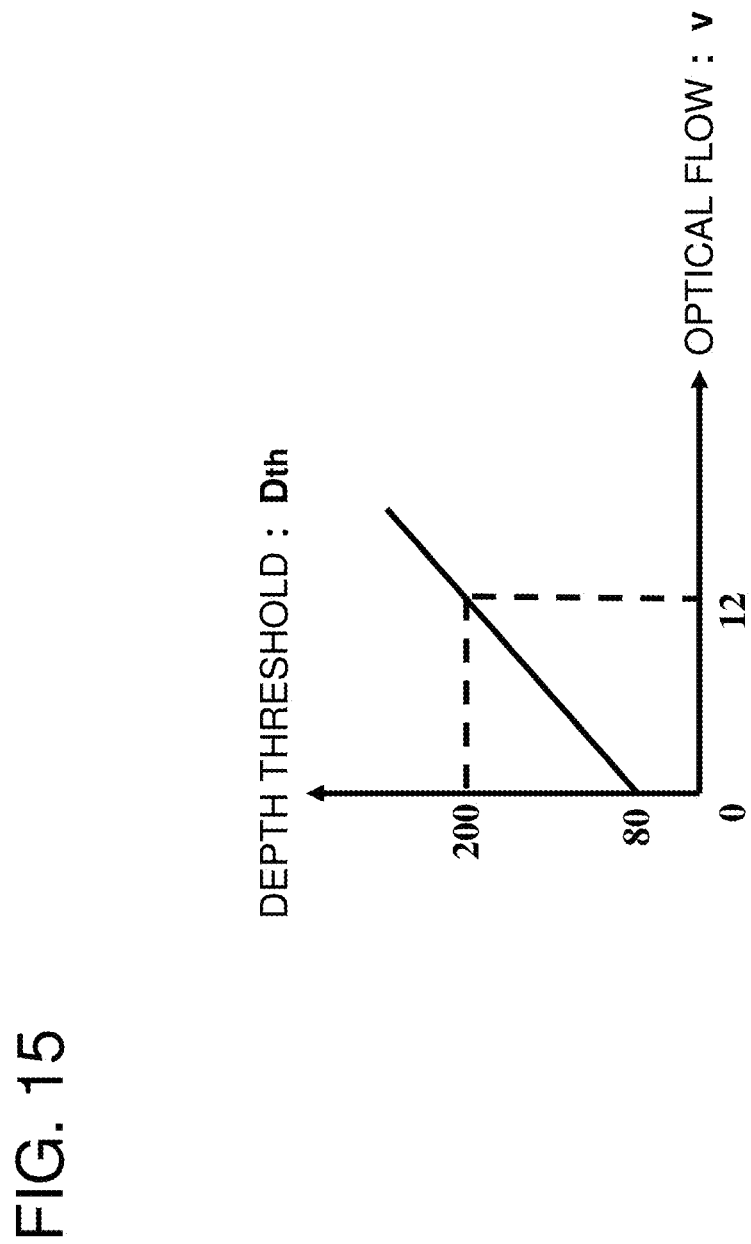
FIG. 15 is a graph showing a relationship between a depth threshold and an amount of movement in the region of interest extraction process in FIG. 8.
Figure 16:
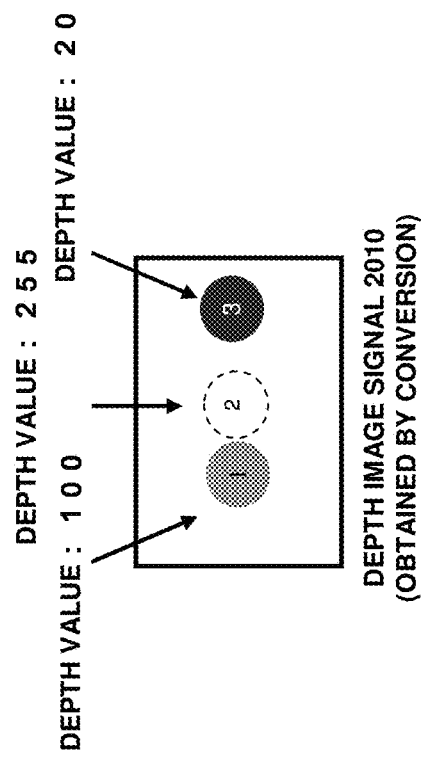
FIG. 16 is a diagram showing a depth image signal obtained by conversion in the region of interest extraction process in FIG. 8.

In step S04, the depth threshold is computed from the optical flow of each region, and the depth image signal 2000d is converted. When the depth value of a certain region is equal to or larger than the computed threshold in that case, a target object to be displayed in this region is 2D-displayed. Thus, the target object is regarded to be indefinitely distant from the viewpoint, and the depth value of this region is converted to 255, as indicated by Equation (2). On the contrary, when the depth value of this region is less than the threshold, the depth value of this region is output without alteration, as indicated by Equation (1). Assume that a relationship between the depth threshold and the optical flow for converting the depth image signal 2000d is defined to be a linear relationship as shown in FIG. 15. Then, the depth threshold of the ball 1 having the optical flow of 12 becomes 200 and the depth threshold of each of the balls 1 and 2 that are still becomes 80, because a proportionality coefficient a between the depth threshold and the optical flow is 10 and the depth threshold b of a still object is 80. When the depth threshold and the depth value of each region are substituted into Equation (2), the depth of the ball 2 is 255 in the depth image signal 2010 obtained by the conversion (refer to FIG. 16).

In step S05, the depth image signal 2010 obtained by the conversion is output.

The relationship between the depth threshold and the optical flow is assumed to be represented by a linear function. The relationship may be set to belong to a relationship other than the linear function.

As described above, by performing depth conversion in view of the optical flow for each pixel of the two-dimensional image using the region of interest extraction unit 110, generation of the depth image signal including information corresponding to the region of interest can be automatically generated. Accordingly, the parallax image generation unit 120 can restore a distance between the object and each of right and left viewpoints from the depth image signal 2010 obtained by the conversion. A parallax amount of each pixel in the current frame image 2000 can be computed. The left-eye parallax image 2000Lo and the right-eye parallax image 2000Ro can be generated by performing a displacement process of each pixel, according to the computed parallax amount.

The process performed by the parallax image generation unit 120 is indicated by Equation (6). A computation equation of a shift amount Δu (u, v) of a pixel (u, v) of the current frame image 2000 can be expressed by Equation (6).

$$\Delta u(u, v) = \frac{IOD}{z(u, v)} \frac{1}{\tan(Fov/2)} \quad (6)$$

where z(u, v) indicates a distance between one of right and left viewpoints and a point in the three-dimensional space corresponding to the pixel (u, v) in the image of the current frame, and can be computed from the depth image signal 2010 obtained by the conversion. IOD indicates a distance between both of the right and left viewpoints, and Fov indicates a field of view. That is, when the depth value of the target pixel is large, the target pixel is distant from the viewpoint. The shift amount Δu is reduced. A pixel whose depth value has been converted to 255 is regarded to be infinitely distant from the viewpoint. The parallax amount of this pixel is zero. On the contrary, when the depth value of the target pixel is small, the target pixel is near the viewpoint. Thus, the shift amount Δu increases.

Next, using the computed shift amount, the pixel value of the pixel (u, v) of the current frame image is applied to a coordinate (u−Δu, v) of the left-eye parallax image 1000Lo and a coordinate (u+Δu, v) of the-right eye parallax image 1000Ro. By these processes, the left-eye parallax image 1000Lo and the right-eye parallax image 1000Ro having a parallax in the region of interest alone can be generated. Finally, the left-eye parallax image and the right-eye parallax image generated by the 3D image display unit are rearranged to perform display of the mixture of the 2D and 3D images.

In this exemplary embodiment, when a region of interest is extracted, the depth value and the optical flow of a target object are considered. The object having a large optical flow may come close to an observer after several frames and may therefore become the region of interest. Accordingly, the depth threshold is set to be high in advance to perform 3D display of the object having the large optical flow. A mixture of 2D and 3D contents that is more interesting and has a rich power of expression can be thereby created. On the other hand, in order to prevent eyes from not being able to keep track of a rapid movement, the depth threshold is made to depend on the optical flow. Conversion from 2D display to 3D display can be made to be moderate, thereby allowing reduction of burden on eyes. Further, the depth value of a region other than the region of interest is converted to a depth value for the 2D display. Only the region of interest can also be thereby converted into a 3D image automatically.

[Variation Example]

Figure 17:
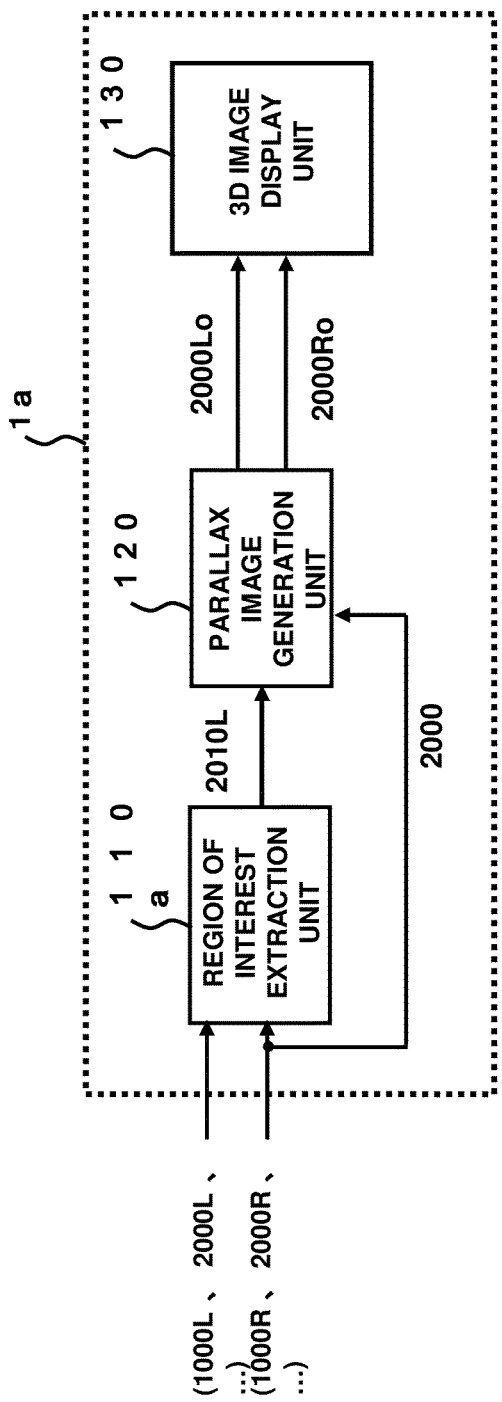
FIG. 17 is a block diagram showing a configuration of an image display device according to a variation example of the first exemplary embodiment.

In this exemplary embodiment, left-eye two-dimensional images (1000L and 2000L) and right-eye two-dimensional images (1000R and 2000R) of a plurality of frames can also be supplied to an image display device 1a, as shown in FIG. 17. Even in this case, a method of extracting a region of interest can be applied to each of the left-eye two-dimensional images (1000L and 2000L) and the right-eye two-dimensional images (1000R and 2000R). As shown in FIG. 17, the image display device 1a includes a region of interest extraction unit 110a, a parallax image generation unit 120, and a 3D image display unit 130.

Figure 18:
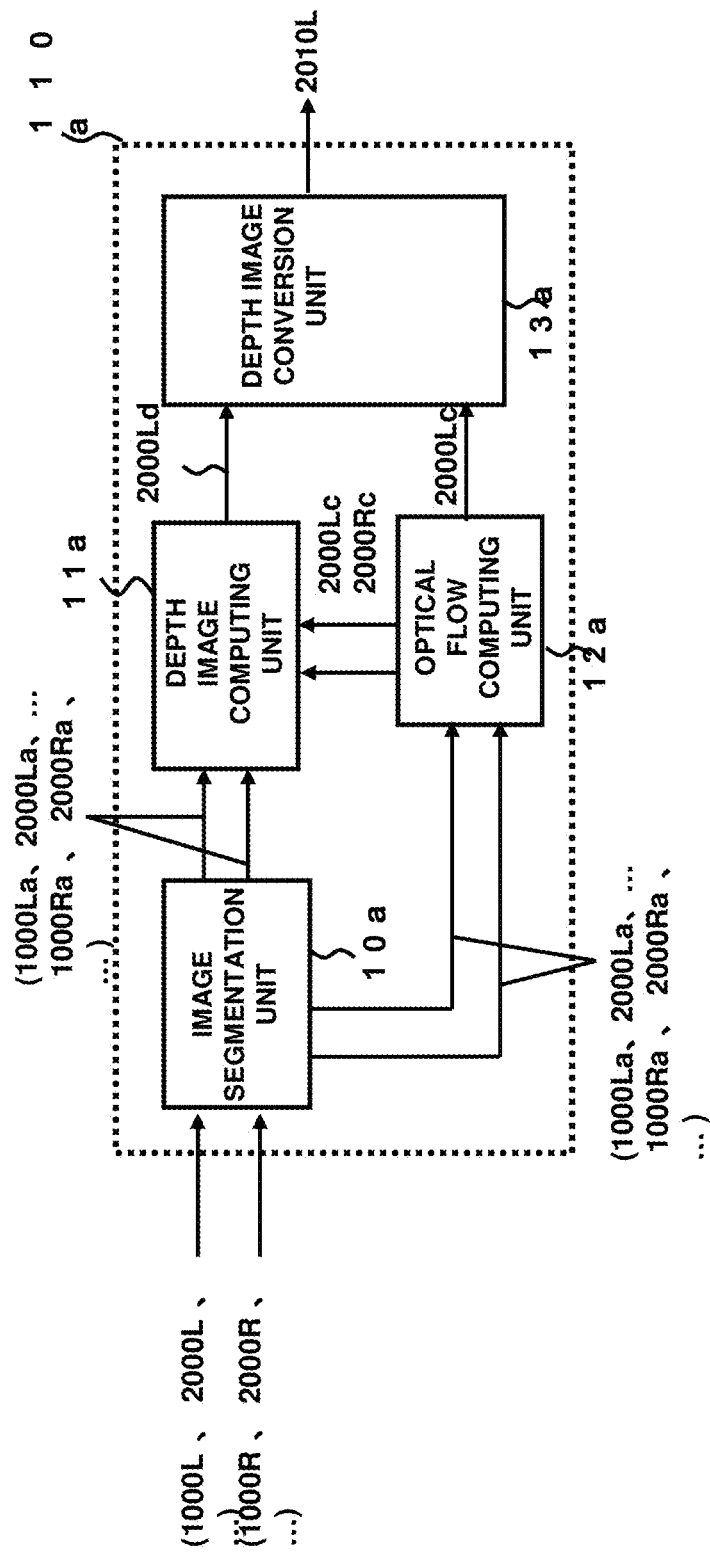
FIG. 18 is a block diagram showing an internal configuration of a region of interest extraction unit in FIG. 17.

FIG. 18 is a block diagram showing a configuration example of the region of interest extraction unit 110a. The region of interest extraction unit 110a is constituted from an image segmentation unit 10a, a depth image computing unit 11a, an optical flow computing unit 12a, and a depth image conversion unit 13a. The left-eye two-dimensional images (1000L and 2000L) and the right-eye two-dimensional images (1000R and 2000R) are successively supplied to the image segmentation unit 10a. Left-eye two-dimensional image signals obtained by division are indicated by reference numerals 1000La and 2000La. Right-eye two-dimensional image signals obtained by the division are indicated by reference numerals 1000Ra and 2000Ra.

Then, the optical flow computing unit 12a estimates a correspondence between respective regions of a divided two-dimensional image (1000La) of an immediately preceding frame and a divided two-dimensional image (2000La) of a current frame and a correspondence between respective regions of a divided two-dimensional image (1000Ra) of the immediately preceding frame and a divided two-dimensional image (2000Ra) of the current frame, using color information and luminance information on each of the right-eye and left-eye two-dimensional image signals obtained by the division. Then, the optical flow computing unit 12a outputs a difference value between the centers of gravity of the regions of the divided two-dimensional image (1000La) and the divided two-dimensional image (2000La) corresponding to each other, as an optical flow 2000Lc of the region. The optical flow computing unit 12a also outputs a difference value between the centers of gravity of the regions of the divided two-dimensional image (1000Ra) and the divided two-dimensional image (2000Ra) corresponding to each other as an optical flow 2000Rc of the region.

Next, the divided left-eye two-dimensional image 1000La of the immediately preceding frame, the divided right-eye two-dimensional image 1000Ra of the immediately preceding frame, the divided left-eye two-dimensional image 2000La of the current frame, the divided right-eye two-dimensional image 2000Ra of the current frame, and the optical flows between the respective corresponding regions of the right-eye and left-eye two-dimensional images of the current frame are supplied to the depth image computing unit 11a. The depth image computing unit 11a estimates a correspondence between the respective regions of the divided left-eye two-dimensional image 2000La of the current frame and the divided right-eye two-dimensional image 2000Ra of the current frame, by referring to the optical flow of and luminance information on the respective regions of the divided left-eye two-dimensional image 2000La of the current frame and the divided right-eye two-dimensional image 2000Ra of the current frame. The depth image computing unit 11a estimates a depth value from a parallax amount of the region obtained from the centers of gravity of the regions corresponding to each other.

Finally, the computed depth value and the optical flow 2000Lc are supplied to the depth image conversion unit 13a. Then, employing a depth threshold Dth with an optical flow used as a parameter, a region of interest is determined. The depth value of a region other than the region of interest is then converted to the depth value for 2D display. Then, a depth image 2010L obtained by the conversion is output.

Figure 19:
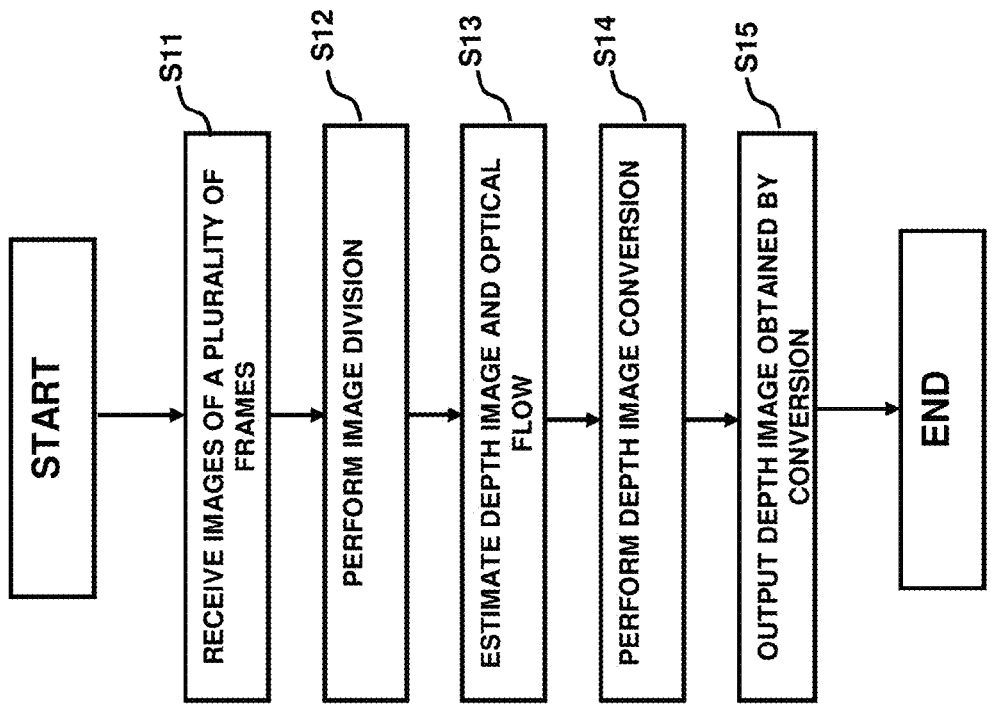
FIG. 19 is a flowchart of a process of extracting a region of interest using two-dimensional images of a plurality of frames.
Figure 20:
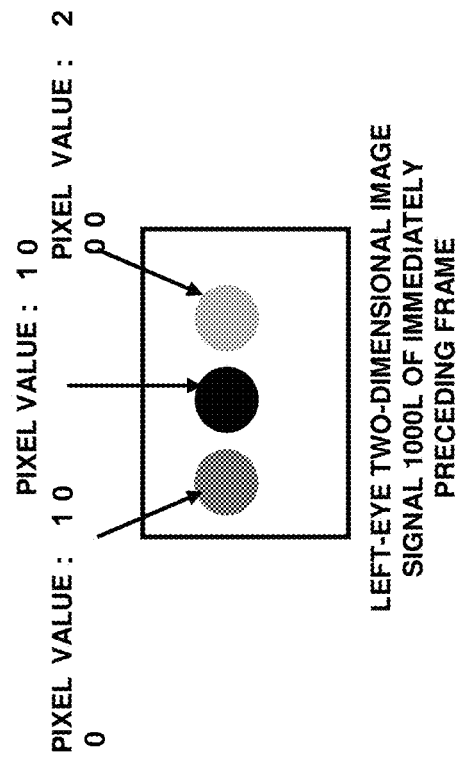
FIG. 20 is a diagram showing a left-eye two-dimensional image of an immediately preceding frame in the region of interest extraction process in FIG. 19.
Figure 21:
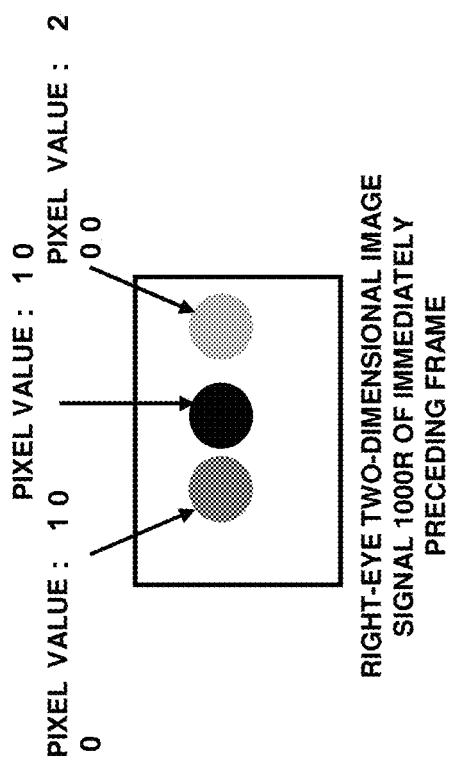
FIG. 21 is diagram showing a right-eye two-dimensional image of the immediately preceding frame in the region of interest extraction process in FIG. 19.
Figure 22:
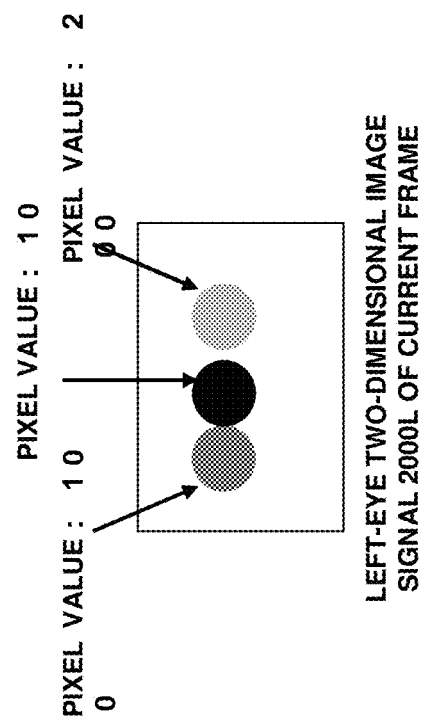
FIG. 22 is a diagram showing a left-eye two-dimensional image of a current frame in the region of interest extraction process in FIG. 19.
Figure 23:
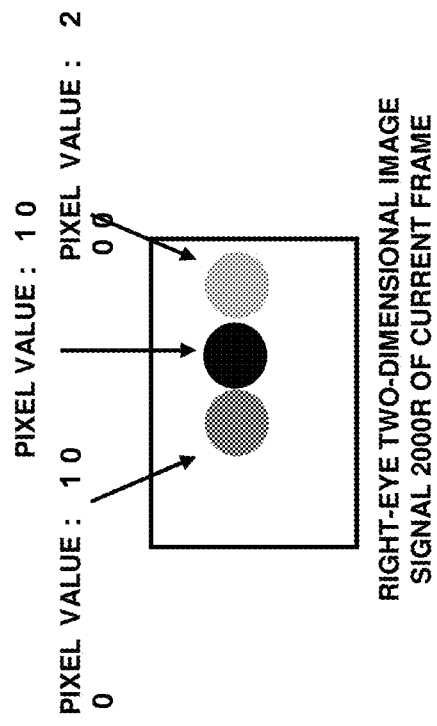
FIG. 23 is diagram showing a right-eye two-dimensional image of the current frame in the region of interest extraction process in FIG. 19.

A method of extracting the region of interest when the left-eye two-dimensional images (1000L and 2000L) and the right-eye two-dimensional images (1000R and 2000R) of the plurality of frames are supplied to the region of interest extraction unit 110a in FIG. 18 will be specifically described. FIG. 19 is a diagram showing a flowchart of a process of extracting the region of interest using the-left eye two-dimensional images (1000L, 2000L) and the right-eye two-dimensional images (1000R, 2000R) of the plurality of frames.

In step S11, the left-eye two-dimensional images (1000L, 2000L) and the right-eye two-dimensional images (1000R, 2000R) of the plurality of frames which have been photographed are chronologically supplied to the region of interest extraction unit 110a. These input images are shown in FIGS. 20 to 23. These two-dimensional images are temporarily saved in a frame buffer (not shown) in the region of interest extraction unit 110a.

Figure 24:
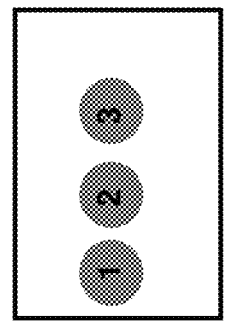
FIG. 24 is a diagram showing a divided left-eye two-dimensional image of the immediately preceding frame in the region of interest extraction process in FIG. 19.
Figure 25:
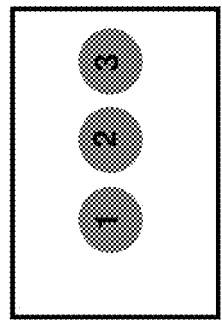
FIG. 25 is diagram showing a divided right-eye two-dimensional image of the immediately preceding frame in the region of interest extraction process in FIG. 19.
Figure 26:
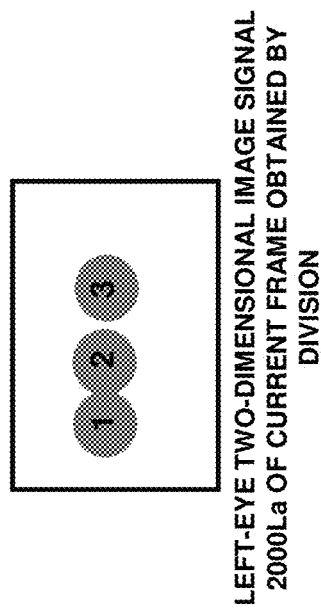
FIG. 26 is a diagram showing a divided left-eye two-dimensional image of the current frame in the region of interest extraction process in FIG. 19.
Figure 27:
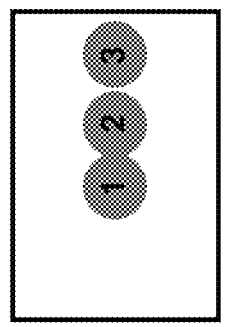
FIG. 27 is diagram showing a divided right-eye two-dimensional image of the current frame in the region of interest extraction process in FIG. 19.

In step S12, an image segmentation process is performed on the left-eye two-dimensional images (1000L, 2000L) and the right-eye two-dimensional images (1000R, 2000R) of the plurality of frames that have been received. FIG. 24 shows the divided left-eye two-dimensional image 1000La of the immediately preceding frame, and FIG. 25 shows the divided right-eye two-dimensional image 1000Ra of the immediately preceding frame. FIG. 26 shows the divided left-eye two-dimensional image 2000La of the current frame, and FIG. 27 shows the divided right-eye two-dimensional image 2000Ra of the current frame.

Figure 28:
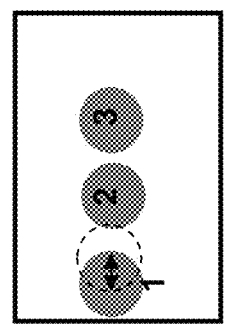
FIG. 28 is a diagram showing optical flow computation results for a left eye in the region of interest extraction process in FIG. 19.
Figure 29:
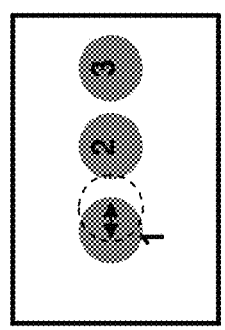
FIG. 29 is a diagram showing optical flow computation results for a right eye in the region of interest extraction process in FIG. 19.

In step S13, using the color information and the luminance information, the correspondence between the respective regions of the divided two-dimensional image (1000La) of the immediately preceding frame and the divided two-dimensional image (2000La) of the current frame and the correspondence between the respective regions of the divided two-dimensional image (1000Ra) of the immediately preceding frame and the divided two-dimensional image (2000Ra) of the current frame are estimated, and the difference value between the centers of gravity of the regions of the divided two-dimensional images (1000La) and (2000La) corresponding to each other and the difference value between the centers of gravity of the regions of the divided two-dimensional images (1000Ra) and (2000Ra) corresponding to each other are output as the optical flows of the region (refer to FIGS. 28 and 29). FIG. 28 shows an optical flow of zero in regions 2 and 3 and an optical flow of 12 in a region 1 between the left-eye two-dimensional images of the immediately preceding and current frames. Optical flows of the respective regions between the right-eye two-dimensional images of the immediately preceding and current frames are the same as those in the case of FIG. 28.

Figure 30:
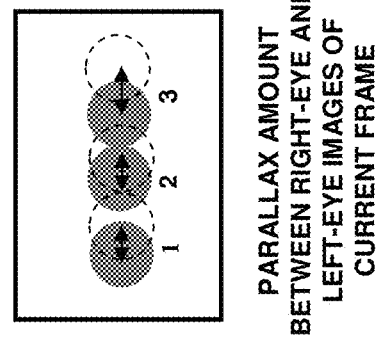
FIG. 30 is a diagram showing an amount of parallax between right and left two-dimensional images of the current frame in the region of interest extraction process in FIG. 19.
Figure 31:
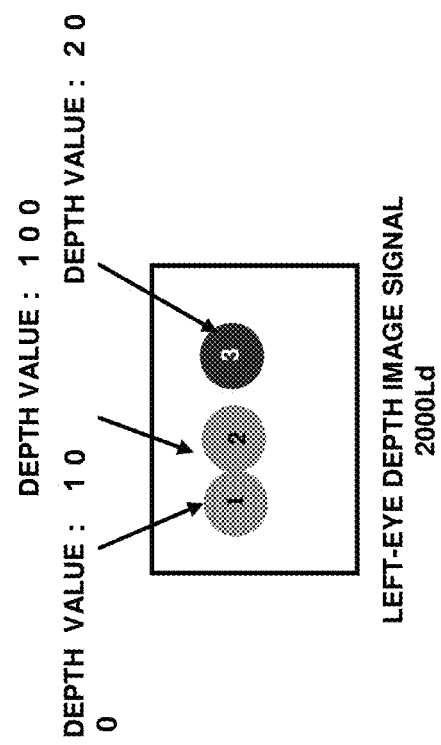
FIG. 31 is a diagram showing a left-eye depth image signal in the region of interest extraction process in FIG. 19.

Next, the divided left-eye two-dimensional image 1000La of the immediately preceding frame, the divided right-eye two-dimensional image 1000Ra of the immediately preceding frame, the divided left-eye two-dimensional image 2000La of the current frame, the divided right-eye two-dimensional image 2000Ra of the current frame, and the optical flows of the respective regions of the right-eye two-dimensional image and left-eye two-dimensional image of the current frame are supplied to the depth image computing unit 11a. The depth image computing unit 11a estimates a correspondence between the respective regions of the divided left-eye two-dimensional image 2000La of the current frame and the divided right-eye two-dimensional image 2000Ra of the current frame, by referring to the optical flows of the respective regions and the luminance information on the respective regions. Then, the depth image computing unit 11a obtains a parallax amount between the regions corresponding to each other, based on positions of the centers of gravity of the corresponding regions, thereby estimating a depth value. FIG. 30 indicates parallax amounts of the right-eye and left-eye two-dimensional images of the current frame. Balls indicated by dotted lines indicate position information on the respective regions in a right-eye parallax image, while gray balls indicate position information on the respective regions in a left-eye parallax image. Referring to FIG. 30, the region 1 (ball 1) and the region 2 (ball 2) have a same parallax amount value. Accordingly, a same depth value is given to the regions 1 and 2. On the other hand, the parallax amount of the region 3 is larger than the parallax amount of each of the regions 1 and 2, which means that the region 3 is nearer to a viewpoint. A small depth value is therefore given to the region 3. FIG. 31 shows a depth image signal 2000Ld for a generated left-eye image of the current frame.

In step S14, depth conversion is performed on one of the depth image signal 2000Ld for a left eye and a depth image signal 2000Rd for a right eye generated in step S13. The specific conversion process is the same as that in step S04 described above when one two-dimensional image has been received.

In step S15, a depth image signal 2010L for the left eye obtained by the conversion is output. The depth image signal 2010L for the left eye obtained by the conversion is supplied to the parallax image generation unit 120 as described above, thereby generating a left eye parallax image 2000Lo and a right eye parallax image 2000Ro where only the region of interest alone has a parallax, according to Equation (6).

Figure 32:
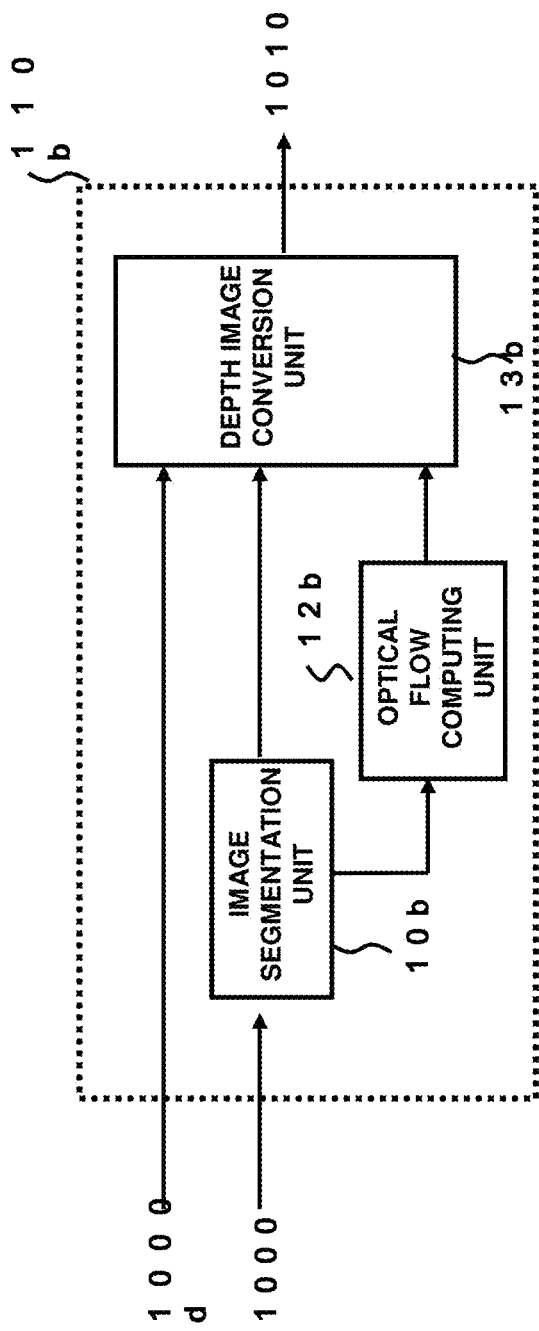
FIG. 32 is a block diagram showing another internal configuration of the region of interest extraction unit in FIG. 1.

When only a depth image signal 1000d and a two-dimensional image 1000 are supplied to an image display device 1, a region of interest extraction unit 110b can be configured as shown in FIG. 32. The region of interest extraction unit 110b is constituted from an image segmentation unit 10b, an optical flow computing unit 12b, and a depth image conversion unit 13b. By directly supplying the depth image signal 1000d to the depth image conversion unit 13b, the depth image computing unit for generating a depth value from a two-dimensional image becomes unnecessary. Though an output of the image segmentation unit 10b is used as an input to the optical flow computing unit 12b, a two-dimensional image may be directly supplied to the optical flow computing unit 12b.

The above description was given about a method of converting 2D display to 3D display by the depth conversion in order to create a perception of image pop-up. This method can also be applied to a case where a visual depth perception is created. When the depth value of a certain region is smaller than a computed threshold in that case, the depth value of the certain region is converted to a depth value for 2D display. On the contrary, when the depth value of this region is larger than the threshold, the depth value is output without alteration.

In this exemplary embodiment, when a region of interest is extracted, the depth value and the optical flow of a target object are considered. The object having a large optical flow may come close to an observer after several frames and may therefore become the region of interest. Accordingly, the depth threshold is set to be high in advance to perform 3D display of the object having the large optical flow. A mixture of 2D and 3D contents that is more interesting and has a rich power of expression can be thereby created. On the other hand, in order to prevent eyes from keeping track of a rapid movement, the depth threshold is made to depend on the optical flow. Conversion from 2D display to 3D display can be made to be moderate, thereby allowing reduction of burden on eyes. Further, the depth value of a region other than the region of interest is converted to a depth value for the 2D display. Only the region of interest can also be thereby converted into a 3D image automatically.

As described above, a mixture of 2D and 3D images, in which a region of interest is automatically extracted from images viewed from different viewpoints and only the region of interest is represented stereoscopically, can be displayed. Patent Document 3 discloses a technology of disposing an identification mark for each of a 2D image and a 3D image in a region other than a region of interest. A method of automatically extracting the region of interest and a specific method of determining the region of interest are not disclosed. In this exemplary embodiment, a depth image signal is estimated from an amount of parallax between received right-eye and left-eye two-dimensional images. More accurate depth information can be thereby obtained. Further, a region of interest is extracted, by employing a depth threshold function using an optical flow as a parameter. Thus, there can be created a mixture of 2D and 3D contents of a video from which an object desired to be noted is more smoothly extracted and burden on eyes is reduced.

[Second Exemplary Embodiment]

Figure 33:
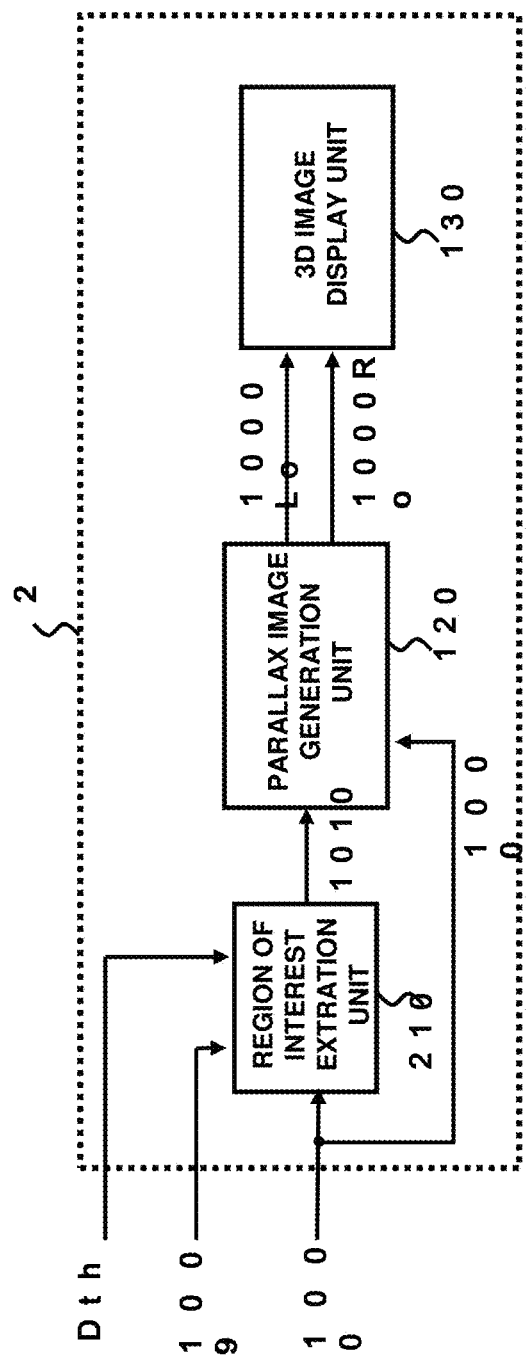
FIG. 33 is a block diagram showing an internal configuration of an image display device in a second exemplary embodiment of the present invention.

Next, a second exemplary embodiment will be described in detail, with reference to drawings. FIG. 33 is a diagram showing a configuration of an image display device 2 according to this exemplary embodiment. Referring to FIG. 33, by assigning same reference numerals to components that are the same as those in FIG. 1, description of the same components will be omitted.

A two-dimensional image 1000, a depth estimation LUT signal 1009 for estimating a depth value, and a depth threshold Dth for converting the depth value are supplied to the image display device 2. The depth estimation LUT signal 1009 is a look-up table signal for estimating the depth value from the shape and the area of each region.

Figure 34:
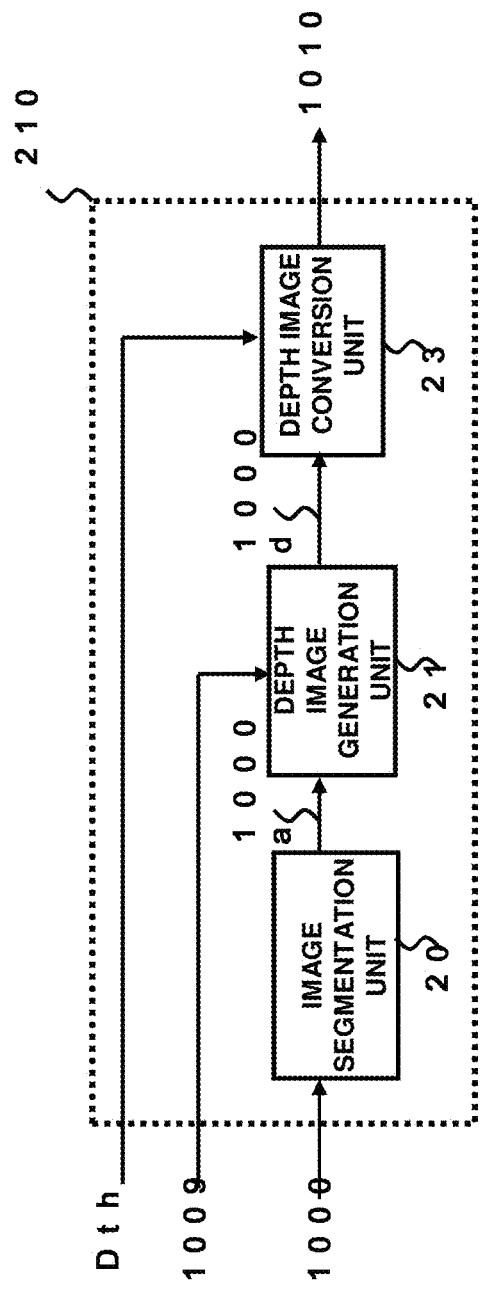
FIG. 34 is a block diagram showing an internal configuration of a region of interest extraction unit in FIG. 33.

FIG. 34 shows a configuration example of a region of interest extraction unit 210. The region of interest extraction unit 210 shown in FIG. 34 is constituted from an image segmentation unit 20, a depth image generation unit 21, and a depth image conversion unit 23.

The image segmentation unit 20 receives a two-dimensional image, performs an image segmentation process based on coordinate values and color information, and outputs a divided two-dimensional image. Next, the divided two-dimensional image is supplied to the depth image generation unit 21, and a depth image signal 1000d is then generated by referring to a table that defines a relationship among the shape, the area, and the depth value of each region.

The depth image conversion unit 23 refers to the received depth threshold, and performs the depth conversion process indicated by Equation (1) and (2) on the depth image signal 1000d generated by the depth image generation unit 21. The depth value of a region other than a region of interest is set to 255 in a depth image signal 1010 obtained by the conversion.

Figure 35:
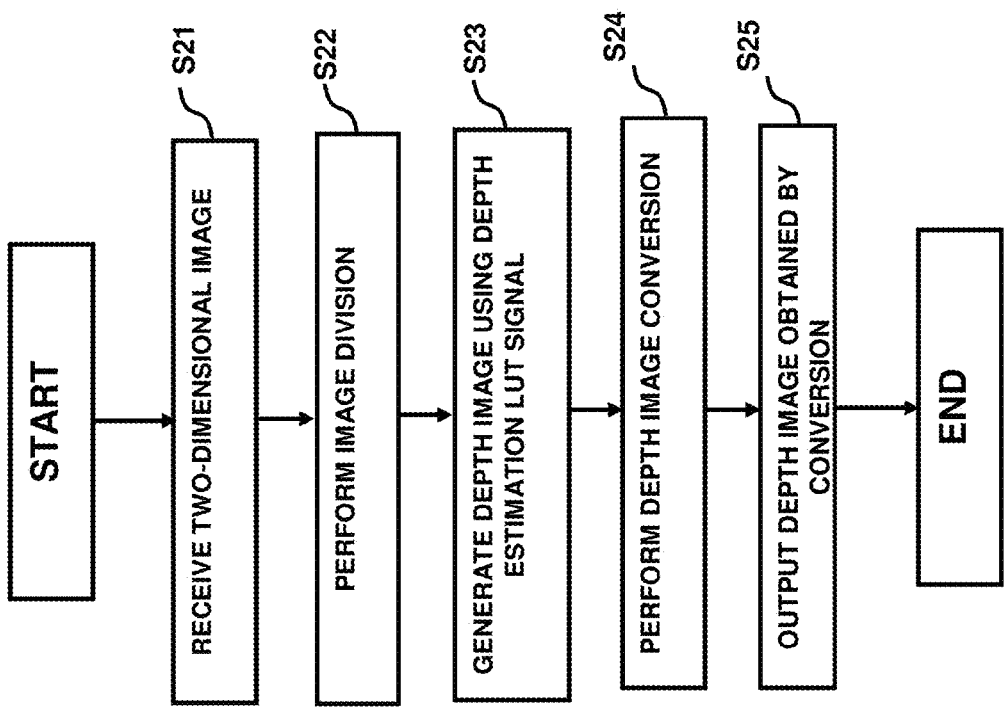
FIG. 35 is a flowchart of a region of interest extraction process in the second exemplary embodiment.

Next, a specific region of interest extraction process in this exemplary embodiment will be explained using a button screen often used as an operation screen for industrial operation, as an example. The explanation of the process will be given with reference to a flowchart (in FIG. 35) of the region of interest extraction process and FIGS. 36 to 40.

Figure 36:
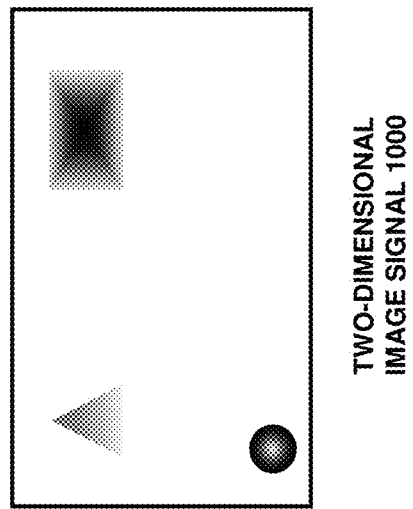
FIG. 36 is a diagram showing a two-dimensional image in the region of interest extraction process in FIG. 35.

A screen as shown in FIG. 36, having three types of buttons of different shapes and different colors is received. A triangular region is indicated by a region 1, a rectangular region is indicated by a region 2, and a circular region is indicated by a region 3.

In step S21, a still two-dimensional image 1000 is supplied to the region of interest extraction unit 210.

Figure 37:
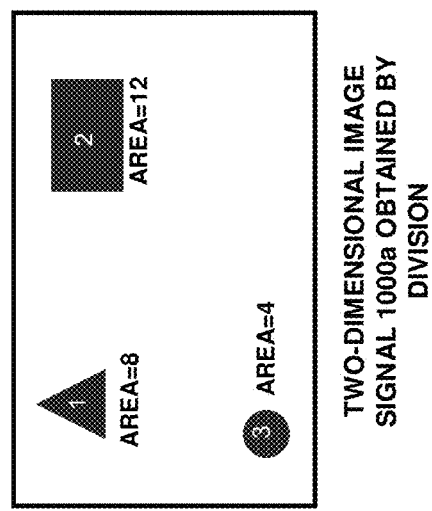
FIG. 37 is a diagram showing a divided two-dimensional image in the region of interest extraction process in FIG. 35.

In step S22, the process of dividing the received two-dimensional image into regions each having uniform pixel characteristics is performed, by referring to coordinate values and luminance values. FIG. 37 is obtained by dividing the button screen in FIG. 36 into three regions, based on the luminance values and the coordinate values.

In step S23, a depth value is assigned to each region by referring to the depth estimation LUT signal 1009 and using features (shape information and area) of each region of the divided two-dimensional image as parameters that are independent to each other. Specifically, the area of each region is first computed. In the example shown in FIG. 37, the area of the triangular region is computed as 8, the area of the rectangular region is computed as 12, and the area of the circular region is computed as 4. Then, by matching the shape information and the area of each region of the divided two-dimensional image with table data registered in the depth estimation LUT signal 1009 in advance, the depth value is assigned to each region.

Figure 38:
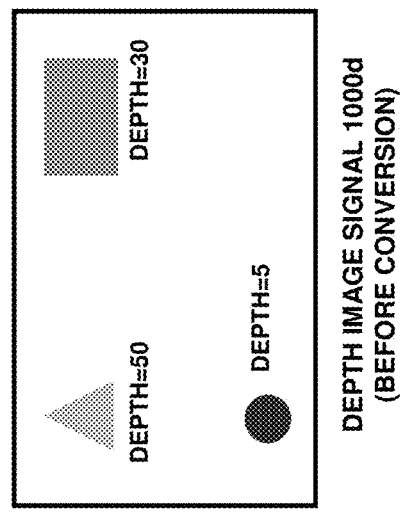
FIG. 38 is a diagram showing a depth image signal before conversion in the region of interest extraction process in FIG. 35.

FIG. 38 shows the depth image signal 1000d generated by referring to the depth estimation LUT signal 1009 shown in FIG. 40. According to the depth estimation LUT signal 1009 in FIG. 40, the depth value of the region 1 (triangular region) is 50, the depth value of the region 2 (rectangular region) is 30, and the depth value of the region 3 (circular region) is 5.

Figure 39:
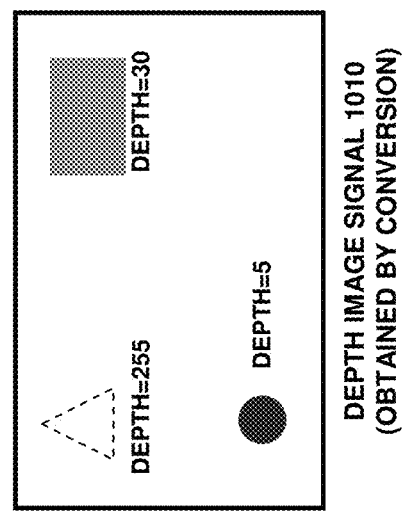
FIG. 39 is a diagram showing a depth image signal obtained by the conversion in the region of interest extraction process in FIG. 35.

In step S24, the depth image conversion indicated by Equations (1) and (2) is performed on the depth image signal 1000d generated in the above-mentioned step S23. When the depth threshold is set to 40 for FIG. 38, for example, the depth image signal 1010 obtained by the conversion is as shown in FIG. 39. In that case, the depth value of the region 1 (triangular region) in FIG. 38 is converted to 255 since the depth value of the region 1 is larger than the depth threshold of 40.

In step S25, the depth image signal obtained by the conversion is output to the parallax image generation unit 120.

In this exemplary embodiment, the description was directed to the process of automatically extracting a region of interest image and the process of automatically generating a depth image, from one two-dimensional image. These processes can also be applied to a case where an input is constituted from right-eye and left-eye two-dimensional images and a case including a depth image. When a depth image signal is included in an input image signal, the depth image generation unit 21 becomes unnecessary.

In this exemplary embodiment, even if an input signal indicates a still two-dimensional image, the depth value of a region other than a region of interest can be converted to a depth value for 2D display, and only the region of interest can be automatically converted into a 3D image.

[Third Exemplary Embodiment]

Next, a third exemplary embodiment will be described in detail, with reference to drawings. In the first to second exemplary embodiments, generation of image data to be displayed by the 3D image display unit was mainly described. In this exemplary embodiment, control by a controller for image display will be described, in addition to generation of data to be displayed by a 3D image display unit.

Figure 41:
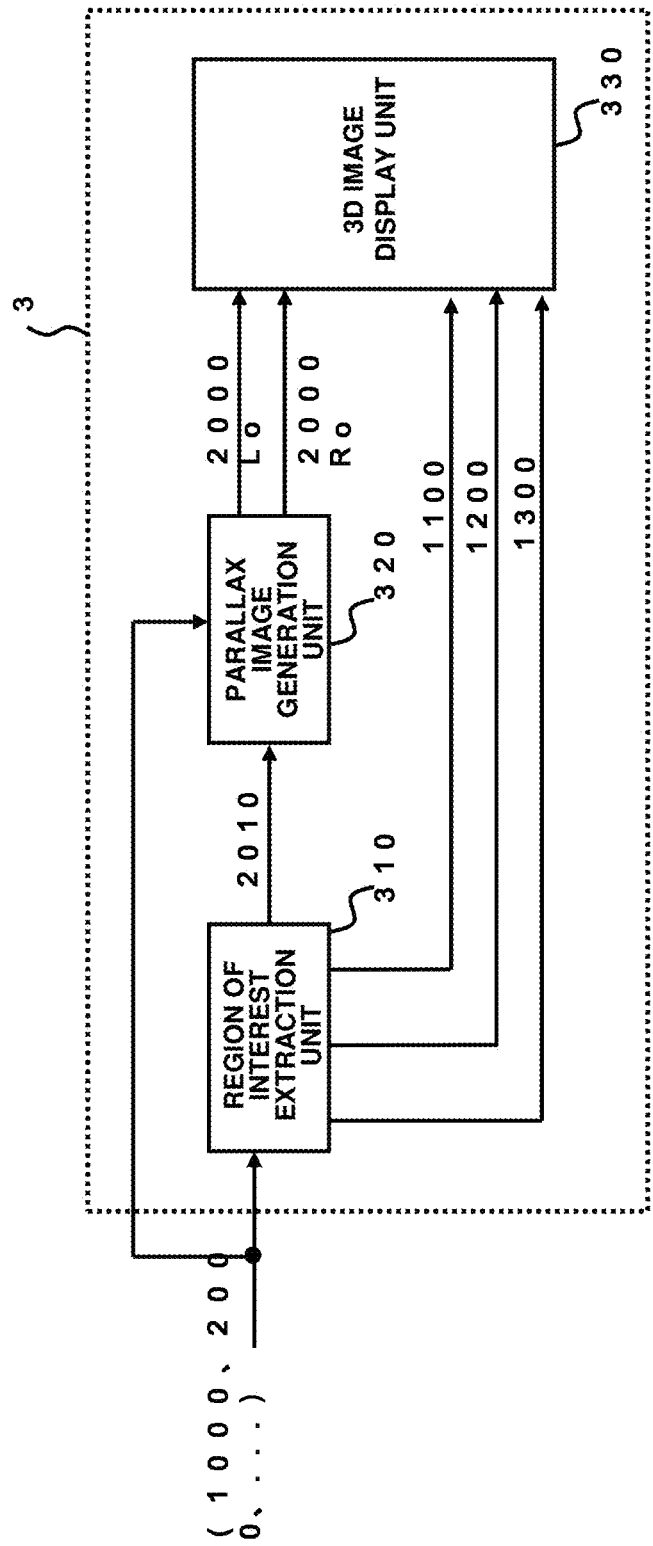
FIG. 41 is a block diagram showing an internal configuration of an image display device according to a third exemplary embodiment of the present invention.

When an image display device is a liquid crystal monitor, it becomes possible to provide a 3D image having a rich power of expression with low power consumption by directly controlling a backlight of the liquid crystal motor. FIG. 41 is a block diagram showing a configuration of an image display device 3 according to this exemplary embodiment. The image display device 3 includes a region of interest extraction unit 310, a parallax image generation unit 320, and a 3D image display unit 330.

Figure 42:
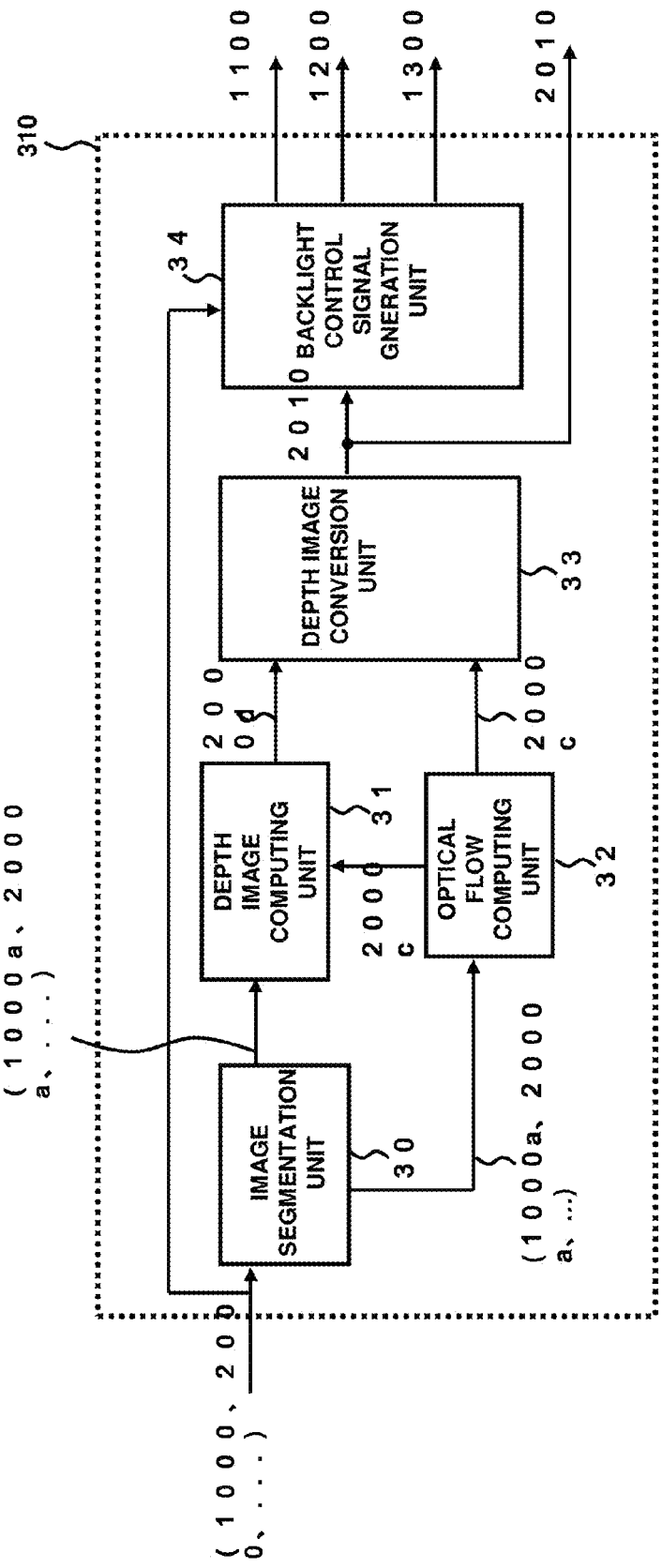
FIG. 42 is a block diagram showing an internal configuration of a region of interest extraction unit in FIG. 41.

A plurality of two-dimensional images (1000, 2000) are chronologically supplied to the image display device 3. FIG. 42 is a block diagram showing an internal configuration of the region of interest extraction unit 310. The region of interest extraction unit 310 is obtained by adding a backlight control signal generation unit 34 to the region of interest extraction unit 110 in the first exemplary embodiment.

The backlight control signal generation unit 34 computes and outputs a position signal 1100 for LEDs of the backlight, indicating a position corresponding to a region of interest or a region having a depth value of other than 255, using a depth image signal 2010 obtained by depth image conversion.

The backlight control signal generation unit 34 refers to the luminance values of the two-dimensional image 2000 to output a luminance signal 1200 for each LED of the backlight. Further, the backlight control signal generation unit 34 outputs a luminance conversion LUT signal 1300 set in the backlight control signal generation unit in advance. The luminance conversion LUT signal 1300 indicates a reference table for converting the luminance signal. A specific example of luminance conversion using the luminance conversion LUT signal 1300 will be described later.

The parallax image generation unit 320 generates a left-eye parallax image 2000Lo and a right-eye parallax image 2000Ro by shifting each pixel to a position corresponding to the computed parallax, based on the depth image signal 2010 obtained by the conversion, and outputs the left-eye parallax image 2000Lo and the right-eye parallax image 2000Ro to the 3D image display unit 330 simultaneously with output of the backlight control signals described above.

Figure 43:
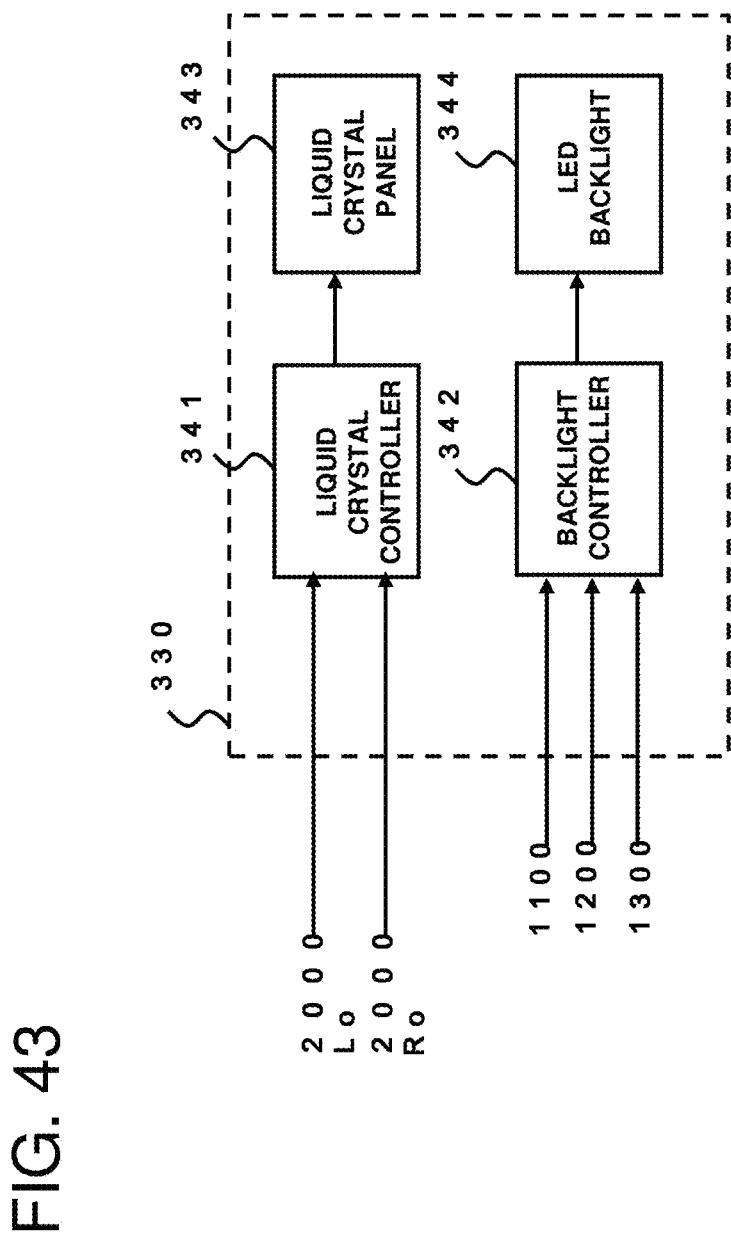
FIG. 43 is a block diagram showing an internal configuration of a 3D image display unit in FIG. 41.

The 3D image display unit 330 includes a liquid crystal controller 341, a backlight controller 342, a liquid crystal panel 343, and a LED backlight 344, as shown in FIG. 43. The liquid crystal controller 341 receives the two-dimensional image, the left-eye parallax image 2000Lo, and the right-eye parallax image 2000Ro, rearranges pixel data according to the pixel arrangement of the liquid crystal panel 343. Then, the liquid crystal controller 341 outputs an output synthesized image to the liquid crystal panel 343, thereby implementing display of a mixture of 2D and 3D images. On the other hand, LED luminance conversion of the LED backlight 344 is possible according to a region of interest and a background region using the backlight controller 342.

Figure 44:
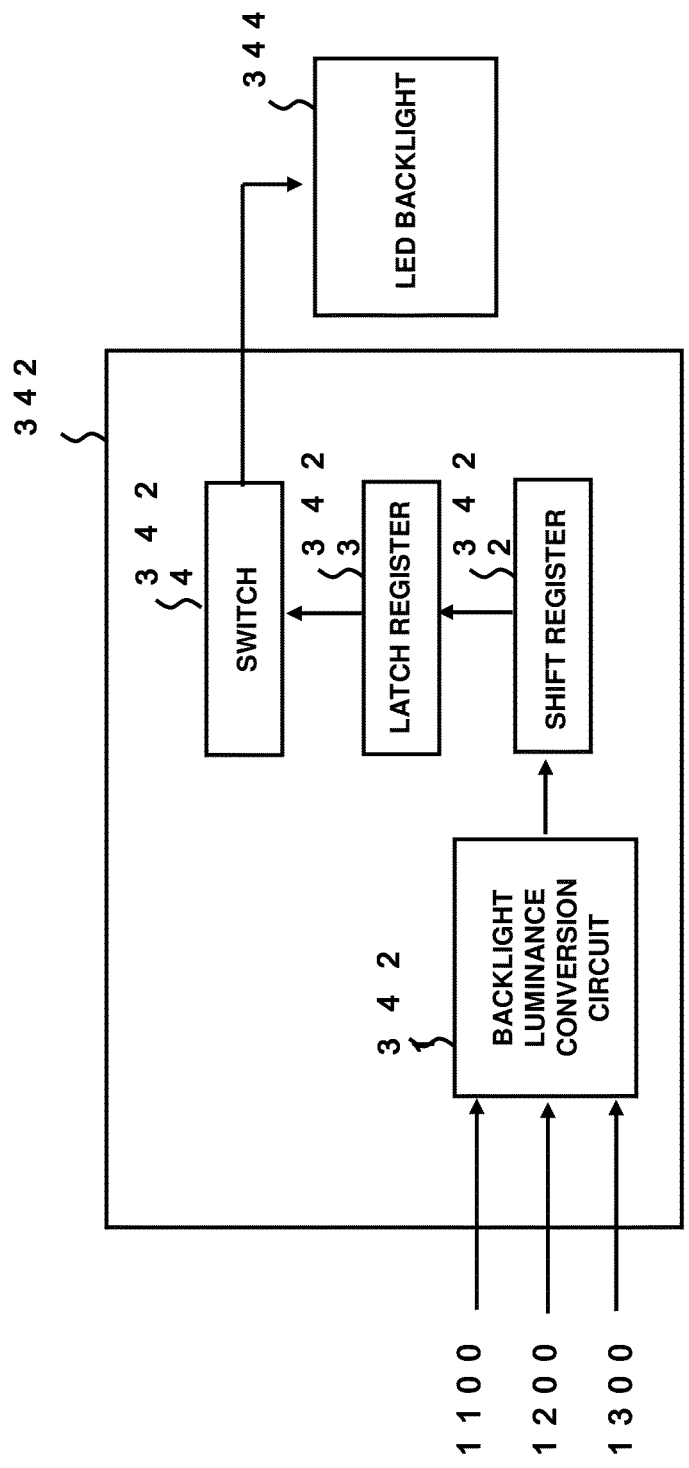
FIG. 44 is a block diagram showing an internal configuration of a backlight controller in FIG. 43.

FIG. 44 is a block diagram showing a detailed configuration of the backlight controller 342. The backlight controller 342 includes a backlight luminance conversion circuit 3421, a shift register 3422, a latch register 3423, and a switch 3424. The backlight luminance conversion circuit 3421 receives the position signal 1100, the luminance signal 1200, the luminance conversion LUT signal 1300, and converts a value of the luminance signal 1200 by referring to the position signal 1100 of the region of interest and the luminance conversion LUT signal 1300.

Herein, a specific process of the luminance conversion will be described. First, each 8 bits of the luminance signal is supplied to the backlight luminance conversion circuit 3421. Then, it is determined whether or not the luminance signal currently received corresponds to the region of interest, using the position signal indicating the region of interest. Then, according to a result of the determination, an appropriate luminance value is found out, using the luminance conversion LUT signal 1300, thereby performing the luminance conversion. Then, a newly generated luminance signal is supplied to the shift register 3422. The shift register 3422 receives each bit of the luminance signal and writes each one bit in the register. When eight bits are written, the shift register 3422 transfers this signal of the 8 bits to the latch register 3423. Finally, a switch signal for controlling the corresponding one or more of the LEDs is generated by a switch 3424. This switch signal controls each LED of backlight.

Figure 45:
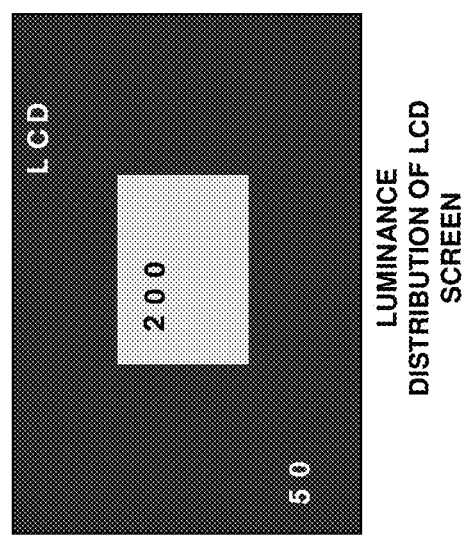
FIG. 45 is a diagram showing an example of a luminance distribution diagram of an LCD screen in the third exemplary embodiment.

Next, the reason why power consumption can be reduced due to the process of the luminance conversion by the backlight luminance conversion circuit 3421 will be specifically described, by referring to FIGS. 45 to 49. FIG. 45 is a diagram showing a luminance distribution of an LCD screen. The luminance of the LCD screen is determined by the transmissivity of the liquid crystal panel and the luminance of the backlight. Further, the transmissivity of the liquid crystal panel depends on the grayscale value of the display screen. Thus, the gray scale value can be used to represent the transmissivity of the liquid crystal panel. Then, a description will be given, assuming that the luminance of each of the LCD screen and the backlight has been converted to an integer value from 0 to 255.

Figure 46:
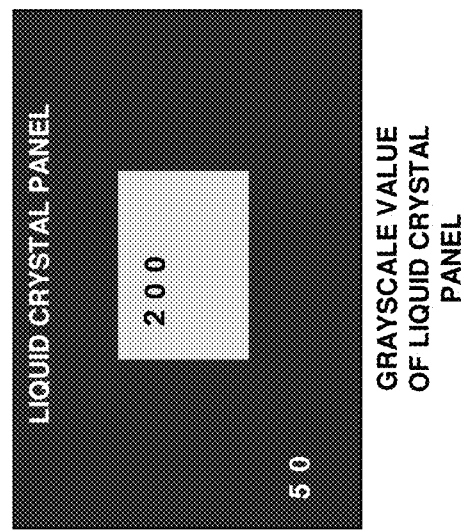
FIG. 46 is a diagram showing an example of a gray scale value of a liquid crystal panel in the third exemplary embodiment.
Figure 47:
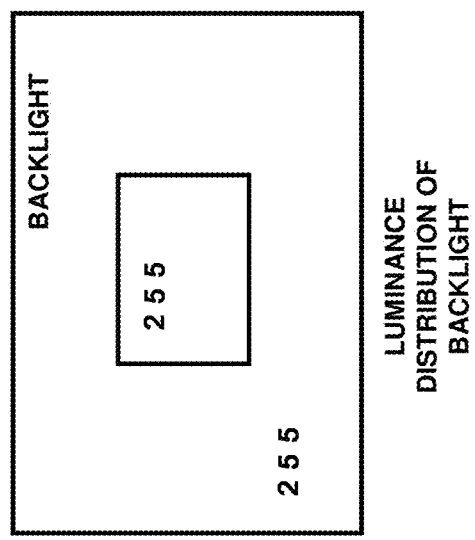
FIG. 47 is a diagram showing an example of a backlight luminance signal distribution in the third exemplary embodiment.

In order to implement the LCD screen having the luminance value of a region of interest of 200 and the luminance value of a region other than the region of interest of 50 as shown in FIG. 45 without individually controlling lighting of each LED, it is necessary to set the gray scale value of the liquid crystal panel so that the luminance of the backlight is uniformly set to 255 (to achieve a luminance of 100%) (as shown in FIG. 47) with the luminance value of the region of interest set to 200 and the luminance value of the region other than the region of interest set to 50 as shown in FIG. 46. It is because, lighting of each LED cannot be individually controlled, and the LED of the region other than the region of interest needs to be matched with lighting of the LED of the region of interest. In this case, the luminance of the backlight is maximized for operation. Thus, power consumption is large.

Figure 48:
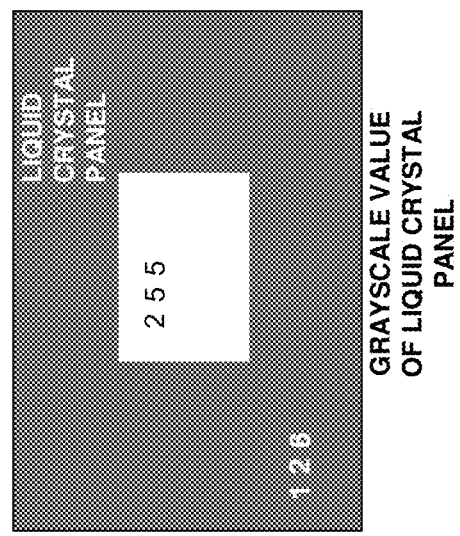
FIG. 48 is a diagram showing an example of a luminance signal after the luminance signal distribution in FIG. 47 has been converted.

Then, in order to reduce the power consumption of the liquid crystal panel, the backlight luminance conversion circuit 3421 performs backlight control. First, each 8 bits of a luminance signal for the backlight in FIG. 47 is supplied to the backlight luminance conversion circuit 3421. Then, the backlight luminance conversion circuit 3421 refers to the position signal 1100 and determines whether or not the input luminance signal corresponds to the region of interest. An appropriate luminance value is found out according to a result of the determination, using the luminance conversion LUT signal 1300 to perform the luminance conversion. When the input signal is the luminance signal for the region of interest, the input signal is not converted and is output as the luminance signal. When the input signal is the luminance signal for the region other than the region of interest, the luminance of the input signal is halved to generate a luminance signal. With the above-mentioned process, the luminance signal for the backlight in FIG. 47 is so converted that the gray scale value of the liquid crystal panel in FIG. 48 is achieved. The luminance signal for the backlight in FIG. 47 is converted so that the region of interest has the luminance value of 255 and the region other than the region of interest has a luminance value of 126, which is a half of the luminance of the luminance signal for the backlight in FIG. 47.

Figure 49:
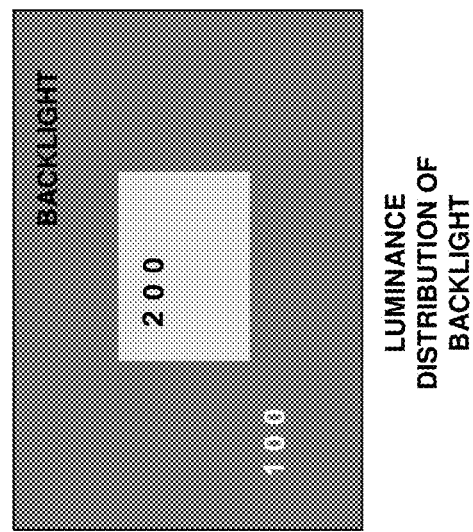
FIG. 49 is a diagram showing an example of a gray scale value of the liquid crystal panel after the luminance of a backlight has been changed.

On the other hand, in order to obtain the luminance distribution of the LCD screen as shown in FIG. 45, the backlight luminance conversion circuit 3421 is used to convert the grayscale value of the display screen of the liquid crystal panel so that the luminance value of the region of interest is 200 and the luminance value of the region other than the region of interest is 100, as shown in FIG. 49. That is, in order to implement the LCD screen having the luminance shown in FIG. 45, control is performed so that lighting of the backlight for the region other than the region of interest is reduced, and the gray scale value of the display screen of the liquid crystal panel is increased by a level corresponding to a reduction of the luminance of the region other than the region of interest caused by reduction of the lighting to compensate for the reduced luminance value of the region other than the region of interest by the increase in the grayscale value. As a result, the luminance of each LED for the region other than the region of interest is reduced. Power consumption can be thereby reduced.

The above description was directed to the case where the backlight luminance conversion circuit 3421 for the LEDs is provided for the backlight controller 342. The backlight luminance conversion circuit 3421 may be provided within the parallax image generation unit 320. The description was directed to the configuration of the 3D image display unit, based on the image display device 3. The control in this exemplary embodiment can also be applied to the first and second exemplary embodiments. As described above, by giving luminance values that are different between each LED for the region of interest and each LED for the background region for the backlight, power consumption can be reduced. Note, however, there are displays having no backlight. Therefore, it is needless to say, the use of (or reference to) the backlight per se may be dispensed with in case of such display screen. For example, the backlight controller may be replaced by a luminance controller, in general. Also LCD may be replaced with any other suitable display screen device available for displaying in general.

Each disclosure of Patent Documents described above is incorporated herein by reference. Modifications and adjustments of the exemplary embodiments and an example are possible within the scope of the overall disclosure (including claims) of the present invention, and based on the basic technical concept of the invention. Various combinations and selections of various disclosed elements are possible within the scope of the claims of the present invention. That is, the present invention of course includes various variations and modifications that could be made by those skilled in the art according to the overall disclosure including the claims and the technical concept. To take an example, all the exemplary embodiments can be implemented by a hardware configuration. The present invention is not limited to this implementation. All the processes can also be performed by causing a CPU (Central Processing Unit) to execute a computer program. In this case, the computer program can be provided by being stored in a storage medium, or can be provided by being transferred through the Internet or other communication medium. As the 3D image display unit in each of the first and second embodiments, a display device such as an LCD, an organic EL, a LED, a PDP, or the like can be applied. Assume the 3D image display unit is applied to a light-emitting display device such as the organic EL, the LED, or the PDP in particular. Then, power consumption is determined by the luminance of each pixel. Thus, a filtering process or gray scale conversion is employed to reduce the luminance value of the region other than the region of interest. A remarkable effect of reducing power consumption can be thereby obtained.

It should be noted that other objects, features and aspects of the present invention will become apparent in the entire disclosure and that modifications may be done without departing the gist and scope of the present invention as disclosed herein and claimed as appended herewith.

Also it should be noted that any combination or selection of the disclosed and/or claimed elements, matters and/or items may fall under the modifications aforementioned.

What is claimed is:

1. An image display device, comprising:
 a region of interest extraction unit that i) generates a depth image signal by depth image conversion employing a depth threshold generated by an amount of movement of images in a 2D/3D mixed display, the depth image signal including information on a distance in a three-dimensional space between a viewpoint and each pixel of a two-dimensional image including a region of interest desired to be noted by an observer, the depth image conversion being such that a depth value for each pixel, the depth value indicating the distance between the viewpoint and each pixel of the two-dimensional image is converted to a new depth value for 2D display when the depth value is equal to or larger than the depth threshold, and ii) extracts the region of interest based on the generated depth image signal;
 a parallax image generation unit that generates a left- and right-eye parallax images each having a parallax in a new region of interest resulting from the new depth value and having no parallax in a region other than the new region of interest, from said two-dimensional image and an image obtained by conversion of a region of interest image to be displayed in the region of interest at each of right and left viewpoints, based on said two-dimensional image and said depth image signal; and
 a 3D image display unit that displays the left-eye parallax image and the right-eye parallax image,
 wherein the region of interest extraction unit comprises:
  an image segmentation unit that receives a first two-dimensional image of a most recent frame and a second two-dimensional image of a frame immediately preceding the most recent frame of the first two-dimensional image, divides each of the first and second two-dimensional images into divided regions each having common characteristic(s) to the first and second two-dimensional images, and generates a divided first two-dimensional image and a divided second two-dimensional image;
  an optical flow computing unit that computes a difference value between center positions of gravity of a divided region of the divided first two-dimensional image and a divided region of the divided second two-dimensional image, as an optical flow of the divided region of the divided first two-dimensional image;
  a depth image computing unit that generates a depth estimation value for each pixel of the divided region of the divided first two-dimensional image based on luminance information on the divided region of the divided first two-dimensional image; and
  a depth image conversion unit that computes the depth threshold from the optical flow, thereby performing the depth image conversion on the depth estimation value.

2. An image display device, comprising:
 a region of interest extraction unit that i) generates a depth image signal by depth image conversion employing a depth threshold generated by an amount of movement of images in a 2D/3D mixed display, the depth image signal including information on a distance in a three-dimensional space between a viewpoint and each pixel of a two-dimensional image including a region of interest desired to be noted by an observer, the depth image conversion being such that a depth value for each pixel, the depth value indicating the distance between the viewpoint and each pixel of the two-dimensional image is converted to a new depth value for 2D display when the depth value is equal to or larger than the depth threshold, and ii) extracts the region of interest based on the generated depth image signal;
 a parallax image generation unit that generates a left-and right-eye parallax images each having a parallax in a new region of interest resulting from the new depth value and having no parallax in a region other than the new region of interest, from said two-dimensional image and an image obtained by conversion of a region of interest image to be displayed in the region of interest at each of right and left viewpoints, based on said two-dimensional image and said depth image signal; and a 3D image display unit that displays the left-eye parallax image and the right-eye parallax image, wherein the region of interest extraction unit comprises:
an image segmentation unit that receives first left-and right-eye two-dimensional images of a most recent frame and second left-and right-eye two-dimensional images of a frame immediately preceding the most recent frame of the first left-and right-eye two-dimensional images, divides each of the first and second left-eye two-dimensional images, and, the first and second right-eye two-dimensional images into divided regions each having common characteristic(s), thereby generating divided first left-and right-eye two-dimensional images, and divided second left-and right-eye two-dimensional images, respectively;

an optical flow computing unit that computes a difference value between center positions of gravity of the divided regions of the divided first and second left-eye two-dimensional images or a difference value between center positions of gravity of the divided regions of the divided first and second right-eye two-dimensional images, as an optical flow for each of the divided regions of the divided first left-and right-eye two-dimensional images, respectively;

a depth image computing unit that generates a depth estimation value for each pixel of the divided region of the divided first left-or right-eye two-dimensional image, based on a parallax amount between the divided regions of the divided first left-and right-eye two-dimensional images; and a depth image conversion unit that computes the depth threshold from the optical flow, thereby performing the depth image conversion on the depth estimation value.

3. An image display method, comprising:
extracting a region of interest from a two-dimensional image a region of interest desired to be noted by an observer, by i) generating a depth image signal through depth image conversion employing a depth threshold generated by an amount of movement of images in a 2D/3D mixed display, the depth image signal including information on a distance in a three-dimensional space between a viewpoint and each pixel of the two-dimensional image including the region of interest, the depth image conversion being such that a depth value for each pixel, the depth value indicating the distance between the viewpoint and each pixel of the two-dimensional image is converted to a new depth value for 2D display when the depth value is equal to or larger than the depth threshold, and ii) extracting the region of interest based on the generated depth image signal;

generating a parallax image by generating left-and right-eye parallax images each having a parallax in a new region of interest resulting from the new depth value and having no parallax in a region other than the new region of interest, from said two-dimensional image and an image obtained by conversion of a region of interest image to be displayed in the region of interest at each of right and left viewpoints, based on said two-dimensional image and said depth image signal; and displaying a 3D image by displaying the left-eye parallax image and the right-eye parallax image, wherein said extracting the region of interest comprises:
receiving a first two-dimensional image of a most recent frame and a second two-dimensional image of a frame immediately preceding the most recent frame of the first two-dimensional image, dividing each of the first and second two-dimensional images into divided regions each having common characteristic(s) to the first and second two-dimensional images, and generating divided first and second two-dimensional images;

computing a difference value between center positions of gravity of a divided region of the divided first two-dimensional image and a divided region of the divided second two-dimensional image, as an optical flow of the divided region of the divided first two-dimensional image;

generating a depth estimation value for each pixel of the divided region of the divided first two-dimensional image based on luminance information on the divided region of the divided first two-dimensional image; and computing the depth threshold from the optical flow, thereby performing the depth image conversion on the depth estimation value.

4. An image display method, comprising:
extracting a region of interest from a two-dimensional image a region of interest desired to be noted by an observer, by i) generating a depth image signal through depth image conversion employing a depth threshold generated by an amount of movement of images in a 2D/3D mixed display, the depth image signal including information on a distance in a three-dimensional space between a viewpoint and each pixel of the two-dimensional image including the region of interest, the depth image conversion being such that a depth value for each pixel, the depth value indicating the distance between the viewpoint and each pixel of the two-dimensional image is converted to a new depth value for 2D display when the depth value is equal to or larger than the depth threshold, and ii) extracting the region of interest based on the generated depth image signal;

generating a parallax image by generating left-and right-eye parallax images each having a parallax in a new region of interest resulting from the new depth value and having no parallax in a region other than the new region of interest, from said two-dimensional image and an image obtained by conversion of a region of interest image to be displayed in the region of interest at each of right and left viewpoints, based on said two-dimensional image and said depth image signal; and displaying a 3D image by displaying the left-eye parallax image and the right-eye parallax image, wherein said extracting the region of interest comprises:
receiving first left-and right-eye two-dimensional images of a most recent frame and second left-and right-eye two-dimensional images of a frame immediately preceding the most recent frame of the first left-and right-eye two-dimensional images, dividing each of the first and second left-eye two-dimensional images, and, the first and second right-eye two-dimensional images into divided regions each having common characteristic(s), thereby generating divided first left-and right-eye two-dimensional images, and, divided second left-and right-eye two-dimensional images, respectively;

computing a difference value between center positions of gravity of the divided regions of the divided first and second left-eye two-dimensional images, or a difference value between center positions of gravity of the divided regions of the divided first and second right-eye two-dimensional images, as an optical flow for each of the divided regions of the divided first left-and right-eye two-dimensional images, respectively;

generating a depth estimation value for each pixel of the divided region of the divided first left-or right-eye two-dimensional image, based on a parallax amount between the divided regions of the divided first left-and right-eye two-dimensional images; and computing the depth threshold from the optical flow, thereby performing the depth image conversion on the depth estimation value.

5. A computer program recorded on a non-transient recording medium that causes, upon execution by a processor of a computer equipped with an image display device, to cause the computer execute:

a region of interest extraction process of extracting a region of interest from a two-dimensional image a region of interest desired to be noted by an observer, by i) generating a depth image signal through depth image conversion employing a depth threshold generated by an amount of movement of images in a 2D/3D mixed display, the depth image signal including information on a distance in a three-dimensional space between a viewpoint and each pixel of the two-dimensional image including the region of interest, the depth image conversion being such that a depth value for each pixel, the depth value indicating the distance between the viewpoint and each pixel of the two-dimensional image is converted to a new depth value for 2D display when the depth value is equal to or larger than the depth threshold, and ii) extracting the region of interest based on the generated depth image signal;

a parallax image generation process of generating a parallax image by generating left-and right-eye parallax images having a parallax in a new region of interest resulting from the new depth value and having no parallax in a region other than the new region of interest, from said two-dimensional image and an image obtained by conversion of a region of interest image to be displayed in the region of interest at each of right and left viewpoints, based on said two-dimensional image and said depth image signal; and a 3D image display process by displaying the left-eye parallax image and the right-eye parallax image, wherein said region of interest extraction process comprises:

an image segmentation process of receiving a first two-dimensional image of a most recent frame and a second two-dimensional image of a frame immediately preceding the most recent frame of the first two-dimensional image, dividing each of the first and second two-dimensional images into divided regions each having common characteristic(s) to the first and second two-dimensional images, and generating divided first and second two-dimensional images;

a moving amount computing process of computing a difference value between center positions of gravity of a divided region of the divided first two-dimensional image and a divided region of the divided second two-dimensional image, as an optical flow of the divided region of the divided first two-dimensional image;

a depth image computing process of generating a depth estimation value for each pixel of the divided region of the divided first two-dimensional image based on luminance information on the divided region of the divided first two-dimensional image; and a depth image conversion process of converting the depth estimation value to a depth value for 2D display when the depth estimation value is equal to or larger than a depth threshold computed from said optical flow.

6. A computer program recorded on a non-transient recording medium that causes, upon execution by a processor of a computer equipped with an image display device, to cause the computer execute:

a region of interest extraction process of extracting a region of interest from a two-dimensional image a region of interest desired to be noted by an observer, by i) generating a depth image signal through depth image conversion employing a depth threshold generated by an amount of movement of images in a 2D/3D mixed display, the depth image signal including information on a distance in a three-dimensional space between a viewpoint and each pixel of the two-dimensional image including the region of interest, the depth image conversion being such that a depth value for each pixel, the depth value indicating the distance between the viewpoint and each pixel of the two-dimensional image is converted to a new depth value for 2D display when the depth value is equal to or larger than the depth threshold, and ii) extracting the region of interest based on the generated depth image signal;

a parallax image generation process of generating a parallax image by generating left-and right-eye parallax images having a parallax in a new region of interest resulting from the new depth value and having no parallax in a region other than the new region of interest, from said two-dimensional image and an image obtained by conversion of a region of interest image to be displayed in the region of interest at each of right and left viewpoints, based on said two-dimensional image and said depth image signal; and a 3D image display process by displaying the left-eye parallax image and the right-eye parallax image, wherein said region of interest extraction process comprises:

an image segmentation process of receiving first and second left-eye two-dimensional images of a most recent frame and a second left-and right-eye two-dimensional images of a frame immediately preceding the most recent frame of the first left-and right-eye two-dimensional images, dividing each of the first and second left-eye two-dimensional images, and, the first and second right-eye two-dimensional images, into divided regions each having common characteristic(s), thereby generating divided first left-and right-eye two-dimensional images, divided second left-and right-eye two-dimensional images, respectively;

an optical flow computing process of computing a difference value between center positions of gravity of the divided regions of the divided first and second left-eye two-dimensional images or a difference value between center positions of gravity of the divided regions of the divided first and second right-eye two-dimensional images, as an optical flow of each of the divided regions of the divided first left-and right-eye two-dimensional images, respectively;

a depth image computing process of generating a depth estimation value for each pixel of the divided region of the divided first left-or right-eye two-dimensional image, based on a parallax amount between the divided regions of the divided first left-and right-eye two-dimensional images; and a depth image conversion process of converting the depth estimation value to a depth value for 2D display when the depth estimation value is equal to or larger than a depth threshold computed from the optical flow.

* * * * *